United States Patent
Simmons et al.

(10) Patent No.: US 10,087,320 B2
(45) Date of Patent: Oct. 2, 2018

(54) CONDUCTIVE POLYMER-MATRIX COMPOSITIONS AND USES THEREOF

(71) Applicant: PolyDrop, LLC, Seattle, WA (US)

(72) Inventors: Carinna Simmons, Seattle, WA (US); Volha Hrechka, Seattle, WA (US); Leah A. Thompkins, Seattle, WA (US); Lilo D. Pozzo, Seattle, WA (US); Brian Panganiban, Seattle, WA (US)

(73) Assignee: PolyDrop, LLC, Seattle, WA (US)

( * ) Notice: Subject to any disclaimer, the term of this patent is extended or adjusted under 35 U.S.C. 154(b) by 0 days.

(21) Appl. No.: 15/824,322

(22) Filed: Nov. 28, 2017

(65) Prior Publication Data

US 2018/0237626 A1    Aug. 23, 2018

Related U.S. Application Data

(60) Provisional application No. 62/460,598, filed on Feb. 17, 2017.

(51) Int. Cl.
| | |
|---|---|
| C04B 14/04 | (2006.01) |
| C08L 25/18 | (2006.01) |
| B60C 19/08 | (2006.01) |
| B60C 1/00 | (2006.01) |

(52) U.S. Cl.
CPC .......... *C08L 25/18* (2013.01); *B60C 1/0016* (2013.01); *B60C 19/08* (2013.01); *C08L 2203/16* (2013.01); *C08L 2205/03* (2013.01); *C08L 2207/04* (2013.01); *C08L 2207/53* (2013.01)

(58) Field of Classification Search
CPC ................ C04B 20/12; B82Y 30/00
USPC .................. 106/482; 524/575; 525/191
See application file for complete search history.

(56) References Cited

U.S. PATENT DOCUMENTS

| | | | |
|---|---|---|---|
| 4,705,645 A | 11/1987 | Lee et al. | |
| 5,494,609 A | 2/1996 | Kulkarni et al. | |
| 6,331,586 B1 | 12/2001 | Thielen et al. | |
| 6,803,446 B2 | 10/2004 | Yang et al. | |
| 7,226,974 B2* | 6/2007 | Nishihara | C08L 23/10 |
| | | | 525/191 |
| 7,361,728 B1 | 4/2008 | Elliott et al. | |
| 8,080,177 B2 | 12/2011 | Long et al. | |
| 8,119,710 B2 | 2/2012 | Gerster et al. | |
| 8,563,089 B2 | 10/2013 | Yoo et al. | |
| 9,127,167 B2 | 9/2015 | Yoo et al. | |

(Continued)

FOREIGN PATENT DOCUMENTS

| | | |
|---|---|---|
| CN | 105646895 A | 6/2016 |
| WO | 2017/136598 A1 | 8/2017 |

(Continued)

OTHER PUBLICATIONS

Han et al., "Preparation of poly(3,4-ethylenedioxythiophene)(PEDOT) coated silica core-shell particles and PEDOT hollow particles", Aug. 2004, ChemComm.*

(Continued)

*Primary Examiner* — Khanh Tuan Nguyen
(74) *Attorney, Agent, or Firm* — Seed IP Law Group LLP

(57) ABSTRACT

A rubber composition comprising a plurality of composite particles and an elastomer is provided. A composite comprising a conductive polymer and a clay particle are also provided. Use of each in various applications and methods of preparing each are also provided.

30 Claims, 7 Drawing Sheets

(56) References Cited

U.S. PATENT DOCUMENTS

| | | | |
|---|---|---|---|
| 9,162,530 B2 | 10/2015 | Du et al. | |
| 2003/0207094 A1 | 11/2003 | Carls et al. | |
| 2005/0175649 A1 | 8/2005 | Disalvo et al. | |
| 2006/0225615 A1* | 10/2006 | Raman | C04B 20/12 |
| | | | 106/482 |
| 2008/0146744 A1 | 6/2008 | Ho et al. | |
| 2008/0305341 A1 | 12/2008 | Plieth et al. | |
| 2011/0146859 A1 | 6/2011 | Schmitz et al. | |
| 2011/0233450 A1 | 9/2011 | Nobuta et al. | |
| 2013/0135750 A1 | 5/2013 | Walker, Jr. et al. | |
| 2013/0296479 A1* | 11/2013 | Martin | B82Y 30/00 |
| | | | 524/575 |
| 2014/0098467 A1 | 4/2014 | Sugawara et al. | |
| 2014/0190730 A1 | 7/2014 | Frey et al. | |
| 2015/0028322 A1 | 1/2015 | Seshadri et al. | |
| 2015/0072159 A1 | 3/2015 | Nakamura et al. | |
| 2015/0183964 A1 | 7/2015 | Witte et al. | |
| 2017/0342253 A1* | 11/2017 | Galizio | C08L 23/283 |

FOREIGN PATENT DOCUMENTS

| | | |
|---|---|---|
| WO | 2017/218516 A1 | 12/2017 |
| WO | 2018/009891 A1 | 1/2018 |

OTHER PUBLICATIONS

Rivas et al., "Poly(acrylic acid-co-maleic acid)—metal complexes with copper(II), cobalt(II), and nickel(II): Synthesis, characterization and structure of its metal chelates," *Polyhedron* 18: 2511-2518, 1999.

\* cited by examiner

CONDUCTIVE POLYMER-MATRIX COMPOSITIONS AND USES THEREOF

BACKGROUND

Technical Field

The present disclosure generally relates to rubber compositions comprising composite particles and an elastomer as well as methods of manufacturing and use of the same.

Description of the Related Art

Typically, elastomeric materials (e.g., rubber) are inherently insulators that require additives in order to create electrical conductivity. Metals (e.g., gold, silver, copper, nickel) and carbonaceous materials (e.g., paracrystalline carbon, graphene, graphite, and carbon nanotubes) have been used for imparting conductive properties unto elastomer-based materials (e.g., tires, gloves, plugs, gaskets, and flexible electronics), but suffer from several unfortunate drawbacks related to health hazards, manufacturing dangers and lack desirable mechanical improvements.

Other additives (e.g., silica) have been used to provide desirable properties. For example, incorporating silica into rubber tires lowers rolling resistance and increases grip. These types of additives are sometimes limited by inadequate dispersal and/or bonding to matrix materials and, as of yet, these types of alternative additives have not been able to desirable mechanical improvements while simultaneously providing electrical conductivity and/or electrostatic discharge.

Accordingly, there is a need in the art for compositions that can provide desired mechanical properties for improving desirable characteristics to elastomeric material while simultaneously imparting electrical conductivity and/or electrostatic discharge to the same. It is desirable that such a composition would allow for safe manufacture and handling and avoid the use of potentially toxic or harmful chemicals. The present disclosure fulfills this need and provides related advantages.

BRIEF SUMMARY

One embodiment of the present disclosure is directed to a composite material comprising a conductive polymer that is adsorbed to the surface of an oxide of silicon, which can provide increase mechanical strength to a composition. Specifically, one embodiment provides a rubber composition comprising:

i) a plurality of composite particles, each composite particle comprising a conductive polymer and an oxide of silicon; and ii) an elastomer.

Such a composition is useful for use in a variety of applications and articles. Accordingly, one embodiment provides an article comprising the foregoing rubber composition, wherein the article is a tire, a tire component, a belt, a belt component, a hose, a gasket or a film.

An additional embodiment provides a composite comprising a conductive polymer and a clay particle, wherein the conductive polymer is in contact with a surface of the clay particle.

The present disclosure also provides methods for preparing the aforementioned embodiments. In one such embodiment, a method for preparing a rubber composition, the method comprising admixing a monomer, a plurality of particles comprising a silicon oxide and an oxidizing agent, thereby polymerizing the monomer to form a plurality of composite particles, the composite particles comprising a conductive polymer on the surface of one of the silicon oxide-containing particles and combining the plurality of composite particles with an elastomer, is provided. Another embodiment provides a method for preparing a composite of the foregoing embodiment, the method comprising admixing a plurality of clay particles, a monomer and an oxidizing agent, thereby polymerizing the monomer and depositing a conductive polymer on surfaces of the clay particles.

More embodiments also provide a film comprising the compositions as disclosed herein, a transparent or semi-transparent substrate coated with a composition as disclosed herein, and uses of the composition in various applications. These and other aspects of the invention will be apparent upon reference to the following detailed description.

BRIEF DESCRIPTION OF THE DRAWINGS

In the figures, identical reference numbers identify similar elements. The sizes and relative positions of elements in the figures are not necessarily drawn to scale and some of these elements may be enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
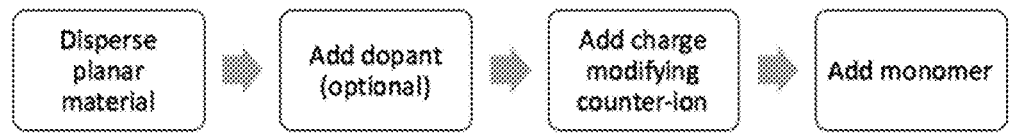
FIG. 1 is an exemplary process flow diagram depicting the procedure by which a polymer-clay particle composite is prepared.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein, and unless the context dictates otherwise, the following terms have the meanings as specified below.

"Aldehyde" refers to a substituent of the formula —C(=O)H.

"Amide" refers to a substituent of the formula —C(=O)N(R)$_2$ or —NRC(=O)R, where each R is independently H, alkyl or aryl as defined herein.

"Amine" refers to a substituent of the formula —N(R)$_2$, where each R is independently H, alkyl or aryl as defined herein.

"Carbonate" refers to a substituent of the formula —OC(=O)OR, where R is alkyl or aryl as defined herein.

"Carbonyl" or "oxo" refers to the (=O) substituent.

"Carboxylate" refers to a substituent of the formula —C(=O)O$^-$.

"Carboxylic acid" refers to a substituent of the formula —C(=O)OH.

"Chlorate" refers to the $ClO_3^-$ anion.

"Chlorite" refers to the $ClO_2^-$ anion.

"Ester" refers to a substituent of the formula —OC(=O)R or —C(=O)OR, where R is alkyl or aryl as defined herein.

"Ether" refers to a compound of the formula ROR, where each R is independently H, alkyl or aryl as defined herein.

A "fluoride" is a compound comprising at least one fluorine atom.

"Hydroxyl" refers to the —OH substituent and "alcohol" can refer to a compound comprising an —OH substituent.

"Imide" refers to substituent of the formula —C(=O)NRC(=O)R' substituent, where R is H, alkyl or aryl, and R' is alkyl or aryl as defined herein.

"Imine" refers to the (=NR) substituent, wherein R is H, alkyl or aryl as defined herein.

"Ketone" refers to the —C(=O)R substituent, where R is alkyl or aryl as defined herein.

"Nitrile" refers to the —CN substituent.

"Nitro" refers to the —NO$_2$ substituent.

"Sulfate" refers to the —OSO$_3$H substituent.

"Sulfonate" refers to the —SO$_3$H substituent.

"Sulfoxide" refers to the —S(=O)R substituent, where R is alkyl or aryl as defined herein.

"Alkyl" refers to a straight or branched hydrocarbon chain radical consisting solely of carbon and hydrogen atoms, which is saturated or unsaturated (i.e., contains one or more double and/or triple bonds), having from one to twelve carbon atoms ($C_1$-$C_{12}$ alkyl), preferably one to eight carbon atoms ($C_1$-$C_8$ alkyl) or one to six carbon atoms ($C_1$-$C_6$ alkyl), and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl, ethenyl, prop-1-enyl, but-1-enyl, pent-1-enyl, penta-1,4-dienyl, ethynyl, propynyl, butynyl, pentynyl, hexynyl, and the like. Alkyl includes alkenyls (one or more carbon-carbon double bonds) and alkynyls (one or more carbon-carbon triple bonds such as ethynyl and the like). "Haloalkyl" refers to an alkyl group comprising at least one halo substituent (e.g., F, Cl, Br, I), for example, fluoroalkyl. "Aliphatic" refers to an alkyl group optionally containing one or more carbon-carbon double bond or carbon-carbon triple bond. Unless stated otherwise specifically in the specification, an alkyl and/or haloalkyl group is optionally substituted.

"Alkylene" or "alkylene chain" refers to a straight or branched divalent hydrocarbon chain linking the rest of the molecule to a radical group, consisting solely of carbon and hydrogen, which is saturated or unsaturated (i.e., contains one or more double and/or triple bonds), and having from one to twelve carbon atoms, e.g., methylene, ethylene, propylene, n-butylene, ethenylene, propenylene, n-butenylene, propynylene, n-butynylene, and the like. The alkylene chain is attached to the rest of the molecule through a single or double bond and to the radical group through a single or double bond. The points of attachment of the alkylene chain to the rest of the molecule and to the radical group can be through one carbon or any two carbons within the chain. Unless stated otherwise specifically in the specification, an alkylene chain is optionally substituted.

"Alkoxy" refers to a radical of the formula —OR$_a$ where R$_a$ is an alkyl radical as defined above containing one to twelve carbon atoms. Unless stated otherwise specifically in the specification, an alkoxy group is optionally substituted.

"Aryl" refers to carbocyclic ring system radicals comprising hydrogen, 6 to 18 carbon atoms and at least one aromatic ring. The aryl radical is a monocyclic, bicyclic, tricyclic or tetracyclic ring system, which may include fused or bridged ring systems. Aryl radicals include, but are not limited to, aryl radicals derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pleiadene, pyrene, and triphenylene. Unless stated otherwise specifically in the specification, the term "aryl" or the prefix "ar-" (such as in "aralkyl") is meant to include aryl radicals that are optionally substituted.

The term "substituted" used herein means any of the above groups (e.g., alkyl, alkylene, alkoxy and/or aryl) wherein at least one hydrogen atom (e.g., 1, 2, 3 or all hydrogen atoms) is replaced by a bond to a non-hydrogen atom such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. In some embodiments, "substituted" means that at least one hydrogen atom is replaced with a bond to —OH, —SH, —CO$_2$H, —OPO$_3$H, —PO$_3$H, —OSO$_3$H, —SO$_3$H or —C(=N)OH. "Substituted" also means any of the above groups in which one or more hydrogen atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles. For example, "substituted" includes any of the above groups in which one or more hydrogen atoms are replaced with —NR$_g$R$_h$, —NR$_g$C(=O)R$_h$, —NR$_g$C(=O)NR$_g$R$_h$, —NR$_g$C(=O)OR$_h$, —NR$_g$SO$_2$R$_h$, —OC(=O)NR$_g$R$_h$, —OR$_g$, —SR$_g$, —SOR$_B$, —SO$_2$R$_g$, —OSO$_2$R$_g$, —SO$_2$OR$_g$, =NSO$_2$R$_g$, and —SO$_2$NR$_g$R$_h$.

"Substituted" also means any of the above groups in which one or more hydrogen atoms are replaced with —C(=O)R$_g$, —C(=O)OR$_g$, —C(=O)NR$_g$R$_h$, —CH$_2$SO$_2$R$_g$, —CH$_2$SO$_2$NR$_g$R$_h$. In the foregoing, R$_g$ and R$_h$ are the same or different and independently hydrogen, alkyl, alkoxy, alkylaminyl, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an aminyl, cyano, hydroxyl, imino, nitro, oxo, thioxo, halo, alkyl, alkoxy, alkylaminyl, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl group. In addition, each of the foregoing substituents may also be optionally substituted with one or more of the above substituents.

"PEDOT" refers to a polymer comprising poly(3,4-ethylenedioxythiophene). Alternate varieties of PEDOT may be achieved through modification using dopants.

"EDOT" refers to the compound 3,4-ethylenedioxythiophene.

"PEDOT:PSS" refers to the polymer PEDOT, as defined above, that is associated to a binding polymer molecule polystyrene-sulfonate (PSS).

"Polymer" refers to a macromolecule comprising one or more structural repeating units (i.e., monomers). A polymer may be further characterized as a homopolymer (i.e., having the same monomers) or a heteropolymer or copolymer (i.e., having different monomers) and include copolymers, block copolymers, star polymers, brush copolymers, comb copolymers, graft copolymers and the like.

A "block copolymer" is a copolymer having a plurality of different monomer types, wherein the same monomer type clusters form a group or "block" that is connected to another block of a different monomer type. For example, a block copolymer is exemplified by the following structure:

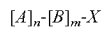

wherein A is a first monomer, B is a second monomer, n and m are an integer greater than 1 and X optionally present as one or more blocks of monomers, which may include A and/or B. Block copolymers can be referred to by the number of blocks (e.g., diblock, triblock, etc.) and/or the composition for each block. For example, poly(styrene-isoprene), poly(styrene-isoprene-styrene), poly([styrene sulfonic acid]-isoprene-[styrene sulfonic acid]), poly(styrene-butadiene), poly(ether-amide). Block copolymers may also be referred to with "block", i.e., poly(styrene block isoprene) or with the moniker "co" poly(styrene-co-butadiene).

A "polymer terminating group" is any moiety that terminates the polymerization of monomers when reacted with a growing polymer chain. For example, a polymer terminating group may be any moiety that reacts with a polymer free radical to terminate the polymerization reaction.

"Monomer" is a molecule that can be combined with itself or other molecules to form a polymer. As used herein, depending on the context, monomer may refer to a molecule that has not been polymerized or as subunit of a formed polymer. For example, pyrrole may refer to the molecule that forms with other monomers to make a polymer (i.e., polypyrrole) or pyrrole may refer to a repeat unit in a polymer.

"Dopant" is an element, molecule or compound that is inserted into or added in a physical mixture with a substance (e.g., film or dispersion) or composition to purposefully modify physical, chemical, or performance characteristics (e.g., electronic conductivity) of the substance or composition.

"Elastomer" refers to a material comprising a polymer having both viscosity and elasticity. Elastomers include, but are not limited to, natural rubber (e.g., cis 1,4-polyisoprene, trans1,4-polyisoprene), synthetic rubber, or combinations thereof. Elastomers also include, for example, isoprene rubber (e.g., polyisoprene), butadiene rubber (e.g., polybutadiene), chloroprene rubber (e.g., polychloroprene, Neoprene, Bayprene), butyl rubber (e.g., poly(isobutylene-isoprene), chlorobutyl rubber, bromobutyl rubber), styrene-butadiene rubber (e.g., poly(styrene-butadiene)), styrene-isoprene rubber (e.g., poly(styrene-isoprene), poly([styrene sulfonic acid]-isoprene-[styrene sulfonic acid])), nitrile rubber (e.g., poly(butadiene-acrylonitrile), hydrogenated nitrile rubbers), ethylene propylene rubbers (e.g., poly(ethylene-propylene), poly(ethylene-propylene-diene)), a fluoroelastomer (e.g., Viton, Tecnofion, Fluorel, Aflas, Dai-El), a perfluoroelastomer (e.g., Tecnoflon PFR, Kalrez, Chemraz, Perlast), a poly(ether-amide), a chlorosulfonated polyethylene (e.g., Hypalon), or an ethylene vinyl acetate.

"Functionality" refers to the specific functional group or substituent present on a molecule or compound (i.e., covalently linked thereto). A molecule (e.g., silica) is said to be "functionalized" or "derivatized" when a chemical reaction is initiated such a new functionality is covalently bound to the molecule. For example, silica may be functionalized with (3-aminopropyl)triethoxysilane by forming one or more covalent bonds between them.

A "salt" is a neutral molecule or compound comprising a positively charged molecular segment and a negatively charged molecular segment.

An "oxide" refers to a molecule or compound comprising an element or molecule that is bound to oxygen.

"Silane" is an alkyl or alkoxy group, wherein at least one hydrogen atom has been replaced with a silicon atom, e.g., Si(CH$_3$)$_4$. A "disilane" is a silane dimer comprising a Si—Si bond.

"Silane-based coupling agent" refers to a reagent comprising silicon that can form a bond with an oxide of silicon (e.g., silica) or clay particle thereby functionalizing the particle. Silane-based coupling agents can have the formula R—(CH$_2$)$_n$—Si—X$_3$ wherein R is a functional group (e.g., alkenyl, amino, epoxy, thio) that can impart desirable characteristics unto the particle (e.g., hydrophobicity, hydrophilicity, thermal stability), X is a hydrolysable group (e.g., alkoxy, ester), and n is an integer greater than 0. Silane-based coupling agents are known in the art and include, for example, (3-aminopropyl)triethoxysilane, methyltrimethoxy silane, methyltriethoxysilane, isobutyltrimethoxysilane, phenyltrimethoxysilane, n-cotyltriethoxysilane, and the like. Silane-based coupling agents also include compounds disclosed in U.S. Pat. Nos. 8,119,710, 8,563,089 and 9,127,167, which are hereby incorporated by reference.

"Silicone rubber" refers to an elastomer composed of silicone comprising additional carbon, hydrogen and oxygen. Silicone rubbers can be one or two part polymers and may contain fillers. Silicone rubber includes, for example, polysiloxanes and polydimethylsiloxanes.

"Solvent" refers to a substance which dissolves, disperses, swells or suspends materials (e.g., conductive polymer, oxide of silicon or clay particles, a composite particles, matrix material, elastomers or combinations thereof). The materials may or may not undergo further reaction within the solvent. The present disclosure provides use of solvents for synthesis as well as formation of a dispersion, dissolution or swelling of the conductive polymer, oxide of silicon or clay particle(s), composite particles, elastomer and/or matrix material. For example, a solvent may be used to swell or dissolve a matrix material or an elastomer and then mix or embed a composite or composite particles therein. Example solvents include, but are not limited to, acetone, ethanol, water, methanol, isopropanol, toluene, xylene, methyl ethyl ketone and benzene.

"Carrier Fluid" or "CF" refers to the chosen solvent for the application of embodiments of the compositions described herein. The compositions may be dispersed within the solvent (i.e., thereby forming a dispersion).

"Film" or "coating" is a thin layer of material or composition layered onto the surface of a substrate or material. The material or composition may or may not be chemically adhered to the surface of a substrate or material.

"Substrate" is a surface to which a coating or film is applied. The substrate can be modified prior to coating to increase mechanical properties, such as adhesion. Substrates include, but are not limited to, plastic (e.g., polyethylene terephthalate), metal, glass, wood, elastomer (e.g., rubber), concrete, stone, and the like.

"Dispersion" is a mixture comprising an embodiment of a composite or rubber composition described herein and a solvent or carrier fluid. The solvent or carrier fluid can be aqueous or non-aqueous. In addition, chemical agents (i.e., surfactant, dispersants) can be added to aid in the dispersion process.

"Anionic" refers to a chemical species which has either gained an electron (or pair of electrons) or lost a proton to form a negatively charged ion.

A "surfactant" is a substance that reduces the surface tension between two materials and thus allows them to interact more intimately. The term "surfactant" is used interchangeably with "dispersant" and encompasses "wetting agents" such as poly(siloxane)-based wetting agents (e.g., AFCONA-3585).

An "ionic liquid" is a salt material containing ions wherein the ions are poorly packed and thus the material is a liquid below 100° C.

"Monovalent" refers to an atom or ion that is capable of forming just one chemical bond.

A "polyol" is a molecule or compound comprising more than one hydroxyl group; these materials often serve as the precursor monomer of polyol polymers.

An "organic solvent" is a compound that contains at least one carbon and is liquid at room temperature (i.e., approximately 25° C.). Example organic solvents include, but are not limited to, acetic acid, acetone, acetonitrile, benzene, chloroform, ethanol, methanol, N-methyl-2-pyrrolidinone, pentane, toluene, xylene, and butanol. Organic solvents may be used as either a solvent or for film removal.

An "acidic solution" is solution which has a pH less than 7.

A "basic solution" is a solution which has a pH greater than 7.

"D(50) particle size" or "Dv50" or "average particle size" refers to the size of a particle as measured through methods known in the art, such as laser diffraction, wherein 50% of the volume of particles has a smaller particle size.

"Neutralizing agent" is a substance which modifies the pH of a material or solution towards 7. In the instance of a material or solution that is acidic, the substance is basic. In the instance of a material or solution that is basic, the substance is acidic.

"Haze" is defined as the percentage of incident light that is scattered away from a normally incident beam by the window.

"Color rendering index" is a measurement of the degree to which light is the same color before and after passing through a medium.

"U-factor" is a measurement of the rate of heat loss through the center of a transparent material. It is not relevant to non-transparent portions of windows, such as sashes and frames.

"Center of glass" or "COG" refers to the middle of a transparent material. The material does not need to be glass in composition and may include non-glass substances such as polymers.

"Ultraviolet" refers to radiation with a wavelength less than 350 nm. The source of ultraviolet radiation may be natural (i.e., sunlight) or synthetically generated (i.e., artificial light source).

"Infrared" refers to radiation with a wavelength greater than 750 nm. The source of infrared radiation may be natural (i.e., sunlight) or synthetically generated (i.e., artificial light source).

"Visible" or "visible light" refers to radiation with a wavelength ranging from 350 nm to 750 nm. The source of infrared radiation may be natural (i.e., sunlight) or synthetically generated (i.e., artificial light source).

A "semi-transparent" substrate is one which allows for the transmission of at least 5% of incoming visible light. It only refers to radiation in the visible spectrum.

A "transparent" substrate is one which allows for the transmission of at least 50% of incoming visible light. It only refers to radiation in the visible spectrum.

"Clay" or "clay material" refers to a finely grained natural or synthetic material comprising a layered atomic structure. Clays are generally classified as phyllosilicates. Clays may include, for example, kaolin, kaolinite, or kaolinite-serpentine (e.g., odinite), smectite (e.g., laponite, hectorite, saponite), illite (e.g., bentonite), chlorite (e.g., baileychlore, chamosite, chlinochlore, cookeite, donbassite, gonyerite, nimite, orthochamosite, pennantite, ripidolite), sepiolite, attapulgite or palygorskite and the like.

The disclosed materials represent a significant advancement over currently known methods for incorporating conductive materials into a matrix material. Previous materials have suffered limitations with regard to either having undesirable performance properties (e.g., low conductivity) or make use of potentially toxic material. Embodiments disclosed herein provide high performance characteristics and are made using relatively benign materials (i.e., materials that do not pose a significant health or safety hazard) for their production. Specifically, embodiments of the present disclosure provide effective and unique 3D and 2D structures of conductive polymer material without templating, which requires the additional processing steps (i.e., removing the template after polymer synthesis).

Embodiments of the present disclosure overcome limitations of existing processes while providing a number of other improvements. For example, in some embodiments the 3D shape of the conductive polymer can be formed in-situ and may be grafted to, grown from, or physically adsorbed to the surface of a variety of different oxide of silicon or clay particles (e.g., modified, unmodified, in situ synthesized) to form a composite particle or composite as described herein. Advantageously, removal of the particles (e.g., the core of the core-shell particles) is not required and provides enhanced mechanical stability to the overall composition.

The properties of the resultant composite particles or composite, such as particle size, density, and electrical conductivity can be controlled and a desired matrix material or elastomer can be selected to provide desirable characteristics (e.g., electrostatic dissipation) of the final composition. For example, in some embodiments, the composite particles or composite is incorporated or embedded by mixing (e.g., mechanical mixing) into a matrix material or elastomer that has been dissolved, swelled, or melted. Beneficially, embodiments of the present disclosure are robust enough to include the use of coupling agents, surfactants, dopants and dispersants.

Embodiments of the present disclosure provide several benefits related to elastomers and elastomer manufacture, for example, rubber tires. Certain embodiments allow for a dramatic decrease in time required for processing during manufacture because the composite particles disperse readily within an elastomer composition. In contrast, previously disclosed silica based additives have poor dispersion characteristics. In addition, some embodiments also allow for decreased particle loading without sacrificing electrostatic discharge performance. Composite particles of the present disclosure can be modified based on desired application to meet desired performance characteristics (e.g., mechanical strength, electrostatic discharge, electrical conductivity, etc.). The aforementioned advantages are detailed in the embodiments described herein.

Compositions

One embodiment provides a rubber composition comprising:

i) a plurality of composite particles, each composite particle comprising a conductive polymer and an oxide of silicon; and ii) an elastomer.

Another embodiment provides a composite comprising a conductive polymer and a clay particle, wherein the conductive polymer is in contact with a surface of the clay particle.

In some embodiments, the conductive polymer is neutral or positively charged and the oxide of silicon or clay particle is neutral or negatively charged. In other embodiments, the composite comprises a physical mixture of a conductive polymer, oxide of silicon and/or an elastomer. In some embodiments, the composite particles comprise core-shell particles having a core comprising the oxide of silicon and a shell comprising the conductive polymer. In some embodiments, the composite comprises core shell particles having a core comprising the clay particle and a shell comprising the conductive polymer. In still another embodiment, the composition or composite comprises a coordinated complex of conductive polymer and oxide of silicon. In yet another embodiment, the conductive polymer and oxide of silicon or clay particle are covalently bound.

In some embodiments, the composite particle or composite is a complex formed by physical adsorption of the conductive polymer onto the surface of the oxide of silicon or clay particle. In certain other embodiments, the composite particle or composite is a complex formed by grafting or cross-linking the conductive polymer to the surface oxide of silicon or clay particle. In still other embodiments, the composite particle or composite is a complex formed by growing the conductive polymer from the surface of the oxide of silicon or clay particle (e.g., with a macroinitiator).

1. Conductive Polymer

The conductive polymer may be any suitable conductive polymer material. For example, in some embodiments the conductive polymer comprises polyaniline, polypyrrole, polythiophene, polyacetylene, polyphenylene, polyvinylene, poly(p-phenylene vinylene), polyphenylene sulfide, polycarbazole, polyindole, polyazepine, polyfluorene, polyphenylene, polypyrene, polyazulene, polynaphthalene or combinations thereof.

In certain related embodiments, a monomer of the conductive polymer is substituted. In some specific embodiments, the conductive polymer comprises a thiophene monomer, for example, the conductive polymer is a polythiophene polymer. In more specific embodiments, the conductive polymer is poly(3,4-ethylenedioxythiophene). In some embodiments, a monomer of the conductive polymer has one of the following structures:

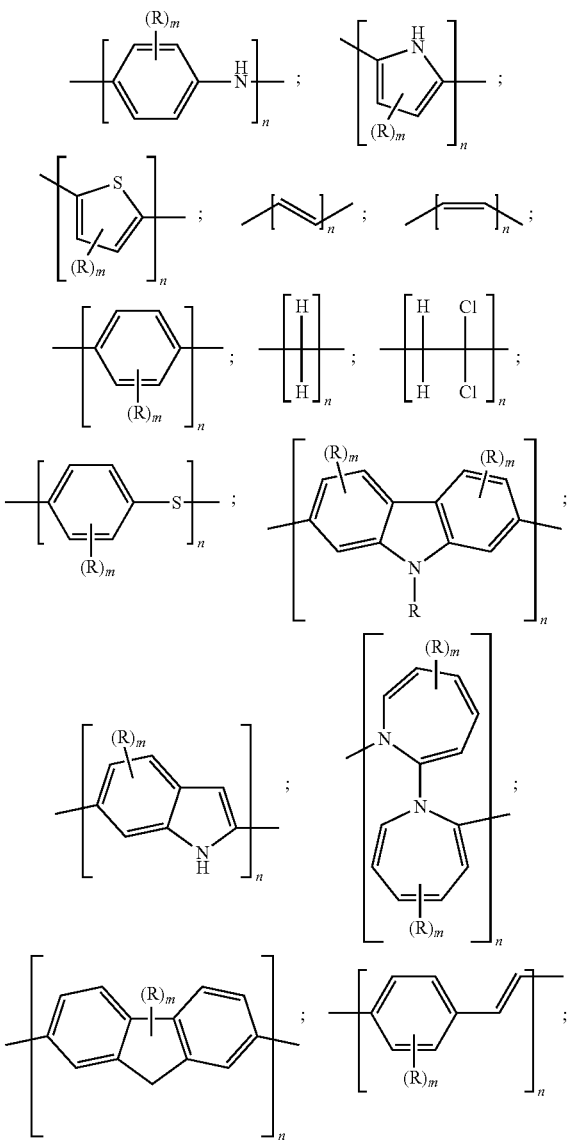

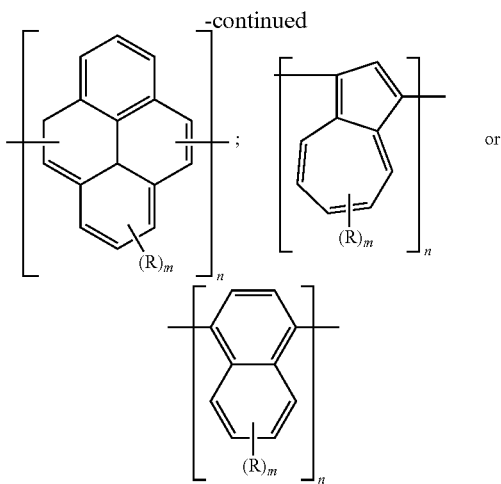

wherein:

R is, at each occurrence, independently H, alkyl, alkenyl, halo (e.g., —F, —Cl, —Br, —I), carboxy, cyano, hydroxyl, 3,4-ethylenedioxy, amino, aminoalkyl or two R substituents join to form a carbocyclic or heterocyclic ring or one occurrence of R combines with another occurrence of R to form a carbocyclic or heterocyclic ring;

n is, at each occurrence, independently an integer greater than 0; and m is, at each occurrence, independently 0 or an integer greater than 0.

In some embodiments, the conductive polymer is a homopolymer. That is, the conductive polymer has only one type of monomer. In other embodiments, the conductive polymer is a heteropolymer. In those embodiments, the conductive polymer has two or more types of monomer (e.g., aniline and pyrrole). In some embodiments, the conductive polymer is a conjugated polymer or an intrinsically conducting polymer.

In other embodiments, the conductive polymer comprises polythiophene or polypyrrole. In some specific embodiments, the conductive polymer is poly(3,4-ethylenedioxythiophene) (PEDOT). In some embodiments, the conductive polymer is polypyrrole.

In some embodiments, the molecular weight of the conductive polymer is greater than 1,000 g/mol, greater than 2,000 g/mol, greater than 5,000 g/mol, greater than 10,000 g/mol, greater than 20,000 g/mol, greater than 50,000 g/mol, greater than 150,000 g/mol, greater than 400,000 g/mol, greater than 1,000,000 g/mol, or greater than 2,000,000 g/mol. In another embodiment, the molecular weight of the conductive polymer after polymerization is less than 5,000,000 g/mol. In some embodiments, the molecular weight of the conductive polymer ranges from about 1,000 g/mol to about 400,000 g/mol, from about 2,000 g/mol to about 150,000 g/mol, from about 5,000 g/mol to about 50,000 g/mol, or from about 5,000 g/mol to about 100,000 g/mol.

In other embodiments, the conductive polymer comprises heteroatoms. For example, in some embodiments the conductive polymer is a polypyrrole, polycarbazole, polyindole, polyazepine, polyaniline, polythiophene or polyphenylene sulfide (e.g., poly(p-phenyl sulfide)).

In still different embodiments, the conductive polymer is a carbocyclic polymer. In yet more embodiments, the conductive polymer is a polyacetylene, polyphenylene, polyvinylene, polyphenylene vinylene, polyfluorene, polyphenylene, polypyrene, polyazulene, or polynaphthalene.

In some embodiments, the concentration of the conductive polymer ranges from about 0.5% to about 30% by weight of the composite particles. In some embodiments, the concentration of the conductive polymer ranges from about 0.1% to about 27%, from about 0.2% to about 25%, from about 0.5% to about 25%, from about 0.75% to about 25%, from about 1% to about 30%, from about 1.5% to about 25%, from about 2% to about 20%, from about 2.5% to about 20%, from about 2.5% to about 15%, from about 3% to about 15%, from about 7% to about 30%, from about 10% to about 25%, from about 15% to about 30% or from about 15% to about 25% by weight of the composite particles.

The conductive polymer can be commercially purchased or synthesized using methods known to those in the art. In some embodiments, a commercially available polymer is used as the conductive polymer. In some embodiments, the conductive is selected from the group consisting of PEDOT:PSS, poly(p-phenylene vinylene), poly(3-hexylthiophene), poly(pyrrole), poly(fluorene), poly(aniline), poly(acetylene) and combinations thereof. In certain embodiments, a commercially available conductive polymer is further modified using one or more additional reagents or components (e.g., an oxidizing agent, a cross-linker, a dopant, a neutralizing agent) to yield a novel composition.

The conductive polymer can be chosen from a range of novel materials and those known in the art, for example those disclosed in U.S. Pat. No. 7,361,728, the full disclosure of which is hereby incorporated by reference in its entirety.

2. Composite Particles

The composite particles or clay particles can be chosen to provide added mechanical strength and durability to the composition. In addition, the composite particles or clay particles act to provide desirable 3-dimensional structure to the conductive polymer. Specifically, the composite particles or clay particles can serve as a template upon which the polymer can be grafted onto, adsorbed to the surface of, or grown from. In addition, in certain embodiments the composite particles or clay particles can be functionalized to impart desirable characteristics (e.g., solubility, disperability). In contrast to prior methods, embodiments of the composite particles or clay particles described herein do not require additional synthetic steps because the particles do not require removal prior to use.

Accordingly, in some embodiments, the mass percent of the composite particles or composite ranges from 0.01% to 50% of the total mass of the rubber composition or a composition that further comprises a matrix material. In some embodiments, the mass percent of the composite particles is less than 10%, less than 9%, less than 8%, less than 7%, less than 6%, less than 5%, less than 4%, less than 3%, less than 2% or less than 1% of the total mass of the rubber composition. In certain embodiments, the mass percent of the composite particles ranges from 0.1% to 47%, from 0.5% to 45%, from 1% to 42%, from 5% to 40%, from 7% to 37%, from 10% to 35%, from 12% to 32%, from 15% to 30%, from 17% to 28%, from 20% to 25% or from 10% to 25% of the total mass of the rubber composition.

In some embodiments, the oxide of silicon or clay particle has a D(50) particle size of less than 1 μm. In some embodiments, the oxide of silicon or clay particle is larger (i.e., a D(50) particle size greater than 1 μm), for example, the oxide of silicon or clay particle is macroscopic. In some embodiments, the oxide of silicon, composite particles or clay particles form higher order 2- or 3-dimensional structures (e.g., networked aggregates). In other embodiments, the oxide of silicon, composite particles or clay particles are discreet particles.

In some embodiments, the oxide of silicon or clay particle is planar. In some embodiments, the oxide of silicon or clay particle and the conductive polymer form nanoplatelets.

In some more specific embodiments, the oxide of silicon or clay particle has a D(50) particle size ranging from 10 nm to 300 µm. In more specific embodiments, the oxide of silicon or clay particle has a D(50) particle size ranging from 10 nm to 10 µm. In some embodiments, the oxide of silicon or clay particle has a D(50) particle size ranging from about 50 nm to about 500 µm, from about 100 nm to about 250 µm, from about 200 nm to about 200 µm, from about 500 nm to about 100 µm, from about 750 nm to about 75 µm, from about 900 nm to about 50 µm, from about 0.25 µm to about 10 µm or from about 0.25 µm to about 5 µm. In certain related embodiments, the particles have a bimodal particle distribution having particles with diameters of about 100 nm and about 2 µm.

In some embodiments, the composite particle comprises a clay comprising the oxide of silicon. In some embodiments, the clay is natural clay. For example, in some embodiments, the clay (e.g., clay particle) comprises a kaolin, smectite, illite, chlorite, sepiolite, attapulgite or combinations thereof. In more specific embodiments, the clay comprises baileychlore, chamosite, clinochlore, cookeite, donbassite, gonyerite, nimite, odinite, orthochamosite, pennatite, ripidolite, suoitelaponite, hectorite, saponite, bentonite, or laponite. In a related embodiment, the clay comprises laponite.

In certain specific embodiments, the oxide of silicon is silicon dioxide. In some embodiments, the oxide of silicon comprises a functional group bound thereto. For example, in some embodiments, the functional group comprises a silane functional group (e.g., (3-aminopropyl)triethoxysilane). Other silane-based coupling agents may be substituted with alkyl (e.g., $C_1$-$C_{12}$ alkyl, $C_1$-$C_8$ alkyl, $C_1$-$C_{18}$ alkyl), alkenyl (e.g., $C_1$-$C_{12}$ alkenyl, $C_1$-$C_8$ alkenyl, $C_1$-$C_{18}$ alkenyl), aminoalkyl, epoxyalkyl, thioalkyl, methoxy, ethoxy, propoxy, iso-propoxy, butoxy, and the like.

In other embodiments, the rubber composition further comprises an inorganic oxide. For example, in some embodiments, the inorganic oxide comprises alumina trihydrate, silica, zinc oxide, titanium oxide, calcium carbonate, barium titanate or combinations thereof.

In certain other embodiments, the rubber composition further comprises comprises a carbon structure. Carbon structures include graphene, graphite, activated carbon, carbon nanotubes, carbon fiber and the like.

In some embodiments, the rubber composition further comprises a semiconductor. In some of these embodiments the semiconductor comprises gallium nitride, aluminum gallium nitride of combinations thereof.

In some embodiments, a portion of a plurality composite particles or clay particles are substantially planar, i.e., having at least one 2-dimensional surface. In some embodiments, a plurality of the composite particles or clay particles are substantially planar throughout. In some embodiments, the majority of plurality of the composite particles or clay particles have at least one planar surface. In some embodiments, plurality of the composite particles or clay particles are curved, creased, bent, folded, crimped, curled, corrugated, crumpled, pleated, telescoped, doubled over, turned under, dog-eared, ruffled or pursed.

In certain embodiments, the oxide of silicon, composite particles or clay particles have an aspect ratio wherein the length of the particle is greater than the height of the particle. In one embodiment, the ratio of the length or width to the height of particles is between 1:1 and 100:1, between 1:1 and 50:1, between 1:1 and 20:1, between 1:1 and 5:1, between 1:1 and 2:1. In yet another embodiment, the ratio of the width to the height of the composite or clay particles is between 10:1 and 1000:1, between 10:1 and 500:1, between 20:1 and 150:1, or between 50:1 and 100:1.

The composite or clay particles can be selected or functionalized based on desirable performance and composition characteristics. For example, the composite or clay particles can be tailored to increase adhesion, electrical conductivity, solubility, interaction with matrix material, increase dispersion in solution or other desired properties of the rubber composition. In addition, a variety of methods of elemental analysis can be used to assess the exact composition, and such methods are well known to those of skill in the art (e.g., gravimetry, optical atomic spectroscopy, neutron activation analysis).

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% manganese.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% aluminum.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% iron.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% silicon.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% nickel.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% lithium.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% magnesium.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% zinc.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% sodium.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% oxygen.

In some embodiments, the composite particles have an atomic composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% carbon.

In some embodiments, the composite particles have an atomic composition of less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05% sulfur.

The oxide of silicon or clay particles may undergo pre-processing prior to polymerization. This may include, but is not limited to milling or size reducing, cleaving, exfoliation in water or solvent, mechanical grinding, or solvent or acid etching.

The oxide of silicon or clay particles may be chemically derivatized in order to modify the characteristics of the rubber composition or composite. Thus, in some embodiments, the oxide of silicon or clay particle comprises a chemical moiety capable of reaction with a counterpart chemical moiety of the conductive polymer to form a cross-link. For example, in some embodiments, the oxide of silicon or clay particle (e.g., covalently linked to the surface thereof) comprises nucleophiles, electrophiles, dienes, dienophiles, aldehyde, oxime, hydrazone, alkyne, amine, azide, acylazide, acylhalide, nitrile, nitrone, sulfhydryl, disulfide, sulfonyl halide, isothiocyanate, imidoester, activated ester (e.g., N-hydroxysuccinimide ester), ketone, $\alpha,\beta$-unsaturated carbonyl, alkene, maleimide, $\alpha$-haloimide, epoxide, aziridine, tetrazine, tetrazole, phosphine, biotin, thiirane and the like. The complementary reactive group in some embodiments of the conductive polymer can be selected such that a covalent bond is formed via a facile reaction, for example, an amine as a complementary reactive group to an N-hydroxysuccinimide ester, isocyanate, or isothiocyanate or an azide as a complementary reactive group to an alkynyl group.

In other embodiments, the conductive polymer is grown from the surface of the oxide of silicon or clay particle, for example, using a macroinitiator.

In some embodiments, the conductive polymer will form a complex with the oxide of silicon or clay particle. Not to be bound by theory, but it is thought that the weight ratio between the conductive polymer and the oxide of silicon or clay particle can impact the final performance properties of the polymer in addition to altering reaction kinetics. In one embodiment, the weight ratio of the conductive polymer to the oxide of silicon or clay particle ranges from 2:1 to 1:1000. In another embodiment, the weight ratio of the conductive polymer to the oxide of silicon or clay particle ranges from 1:1 to 1:500, from 1:2 to 1:100, from 1:3 to 1:20, or from 1:4 to 1:10. In yet another embodiment, the weight ratio of the conductive polymer to the oxide of silicon or clay particle ranges from 2:1 to 1:1, from 1.8:1 to 1.1:1, or from 1:7 to 1.5:1. In yet still another embodiment, the weight ratio of the conductive polymer to the oxide of silicon or clay particle is about 1:4.

In some embodiments, monomer (i.e., a monomer used to form a conductive polymer) will complex with the oxide of silicon or clay particle. In one embodiment, the weight ratio of monomer to the oxide of silicon or clay particle ranges from 2:1 to 1:1000. In another embodiment, the weight ratio of monomer to the oxide of silicon or clay particle ranges from 1:1 to 1:500, from 1:2 to 1:100, from 1:3 to 1:20, or from 1:4 to 1:10. In yet another embodiment, the weight ratio of monomer to the oxide of silicon or clay particle ranges from 2:1 to 1:1, from 1.8:1 to 1.1:1, or from 1:7 to 1.5:1. In yet still another embodiment, the weight ratio of monomer to the oxide of silicon or clay particle is about 1:4.

3. Elastomer and Matrix Material

The elastomer and matrix material can be selected based on the desired application. In some embodiments, the composite composition further comprises a matrix material, e.g., paint, resin, plastic, elastomer, or adhesive. In some embodiments, the matrix material is a solid, for example a powder. In another embodiment, the matrix material is a liquid. In some embodiments, the matrix material is plastic (e.g., a matrix material comprising polyvinyl alcohol).

The elastomer or matrix material can have any form factor. For example, the elastomer or matrix material may comprise a resin or a liquid solvent, such as water. In certain embodiments, the elastomer or matrix material comprises water, benzene, xylene, toluene, ethanol, methanol, methyl-ethyl-ketone, isopropanol, acetone or combination thereof. In another embodiment, the elastomer or matrix material further comprises a surfactant such as Span 20, Span 40, Span 60, Span 80, Span 83, Span 85, Span 120, Tween 20, Tween 21, Tween 40, Tween 60, Tween 61, Tween 65, Tween 80.

In other embodiments, the elastomer or matrix material comprises a phenolic, polyester, epoxy, nitrile, latex, lacquer, polyurethane, polyether, polyethylene terephthalate, acrylonitrile butadiene styrene, polystyrene, polypropylene, polyethylene, polycarbonate, nylon, polyurethane, thermoplastic polyester, okra gum, pitch, *galbanum*, amino resins or combinations thereof. In another embodiment, the elastomer or matrix material comprises a gum resin, a synthetic resin, a thermoplastic resin, or a thermoset resin. In yet other embodiments the elastomer or matrix material comprises zinc, aluminum, titanium, silver, nickel, chromium, copper, tin, or combinations thereof. Alternatively, the elastomer or matrix material comprises a combination of substances listed above.

In one embodiment, the elastomer or matrix material is a powder. The D(50) particle size of the elastomer or matrix powder material can be measured using methods known in the art, such as laser scattering techniques. In one embodiment, the D(50) of the elastomer or matrix material ranges from 10 to 1000 nm, from 10 to 500 nm, from 20 to 300 nm, from 20 to 50 nm, from 50 to 200 nm or from 100 to 150 nm. In another embodiment, the D(50) of the elastomer or matrix material is approximately 200 nm. In yet another embodiment, the D(50) of the elastomer or matrix material ranges from 200 to 1000 nm, from 200 to 500 nm, from 200 to 400 nm or from 250 to 300 nm. In still another embodiment, the D(50) of the elastomer or matrix powder material is less than 10 nm or greater than 1000 nm. In some embodiments, the D(50) particle size of the elastomer or matrix material ranges from 1 μm to 50 μm. In some embodiments, the D(50) particle size of the elastomer or matrix material ranges from 5 µm to 50 µm, from 10 µm to 50 µm, from 15 µm to 50 µm, from 20 µm to 50 µm, or from 25 µm to 50 µm. In some embodiments, the D(50) particle size of the elastomer or matrix material is less than 1000 µm, less than 750 µm, less than 500 µm, less than 250 µm, less than 100 µm, less than 75 µm, less than 60 µm, less than 50 µm, less than 35 µm or less than 25 µm.

In some embodiments, the electronic conductivity of the composite or rubber composition ranges from $10^{-4}$ S/cm to $10^3$ S/cm. In one embodiment, the electronic conductivity of the composite or rubber composition ranges from 1 S/cm to 1000 S/cm, from 1 S/cm to 100 S/cm or from 50 S/cm to 100 S/cm. In another embodiment, the electronic conductivity of the composite or rubber composition ranges from $10^{-4}$ S/cm to 10 S/cm, from $10^{-3}$ S/cm to 1 S/cm or from $10^{-2}$ S/cm to 1 S/cm.

The elastomer or matrix material may be doped with an additive (e.g., a dopant) to further improve the performance characteristics. In some embodiments, the dopant is nickel, aluminum, titanium, or silver.

In certain embodiments, the level of nickel doped into the elastomer or matrix material is greater than 1 wt %, greater than 2 wt %, greater than 5 wt %, greater than 10 wt %, greater than 20 wt %, or greater than 30 wt %. In still another embodiment, the level of nickel doped into the elastomer or matrix material ranges from 3 wt % to 7 wt %. In yet another embodiment, the level of nickel doped into the elastomer or matrix material is approximately 6 wt %.

In other embodiments, the level of aluminum doped into the elastomer or matrix material is greater than 1 wt %, greater than 2 wt %, greater than 5 wt %, greater than 10 wt %, greater than 20 wt %, or greater than 30 wt %.

In certain embodiments, the level of titanium doped into the elastomer or matrix material is greater than 1 wt %, greater than 2 wt %, greater than 5 wt %, greater than 10 wt %, greater than 20 wt %, or greater than 30 wt %.

In certain embodiments, the level of silver doped into the elastomer or matrix material is greater than 1 wt. %, greater than 2 wt %, greater than 5 wt %, greater than 10 wt %, greater than 20 wt %, or greater than 30 wt %. In still another embodiment, the level of silver doped into the elastomer or matrix material ranges from 1 wt % to 5 wt %. In yet another embodiment, the level of silver doped into the matrix material is approximately 3 wt %.

In another embodiment, the dopant comprises a powder form. In yet another embodiment, the dopant is carbon, such as carbon black, carbon nanotubes, activated carbon, graphite, graphene, or combinations thereof. In still another embodiment, the dopant comprises a metal oxide, such as zinc oxide, nickel (II) oxide, copper (IV) oxide, or molybdenum (III) oxide.

In some embodiments, the elastomer is natural rubber, synthetic rubber or a mixture of natural and synthetic rubber. In more specific embodiments, the elastomer comprises an isoprene rubber, a butadiene rubber, a chloroprene rubber, an isobutylene rubber, a butyl rubber, a styrene-butadiene rubber, a styrene-isoprene rubber, a nitrile rubber, an ethylene-propylene rubber, an epichlorohydrin rubber, a polyacrylic rubber, a silicone rubber, a fluorosilicone rubber, a fluoroelastomer, a perfluoroelastomer, a polyether block amide, a chlorosulfonated polyethylene, an ethylene vinyl acetate, a thermoplastic elastomers, a polysulfide, a resilin, an elastin, an elastolefin or combinations thereof.

In some specific embodiments, the elastomer comprises a styrene-butadiene rubber, a styrene-isoprene rubber, an isoprene rubber, a chloroprene rubber or an isobutylene rubber.

In some embodiments, the elastomer comprises a (styrene sulfonic acid)-isoprene-(styrene sulfonic acid) block copolymer.

Depending on the desired characteristics of the final composition or rubber composition (e.g. mechanical strength, flexibility) the elastomer or matrix material may be cross-linked. Accordingly, in some embodiments, a percentage of the elastomer or matrix material is cross-linked. In more specific embodiments, the elastomer is cross-linked to a degree ranging from 0.01% to 100%. In some embodiments, the elastomer is cross-lined to a degree ranging from 0.1% to 90%, from 1% to 90%, from 5% to 90%, from 10% to 90%, from 15% to 90%, from 20% to 90%, from 25% to 90%, from 30% to 90%, from 35% to 90%, from 40% to 90%, from 45% to 90%, from 50% to 90%, from 60% to 90%, from 70% to 90%, from 80% to 90%, from 10% to 20%, from 20% to 30%, from 30% to 40%, from 40% to 50%, from 50% to 60%, from 60% to 70%, from 70% to 80%, from 80% to 90% or from 90% to 100%. In some specific embodiments, the elastomer comprises a degree of cross-linking ranging from 0.01% to 15%. In some embodiments, the degree of cross-linking ranges from 0.1% to 5%

In some embodiments, a rubber composition comprising a conductive polymer-particle composite and an elastomer, wherein the particle composite comprises an inorganic oxide is provided.

In addition, without wishing to be bound by theory, it is thought that the particle size of the composite particle influences the characteristics of the overall composition. Accordingly, in some of the foregoing embodiments, the composite particle has a D(50) particle size ranging from 10 nm to 300 µm or from 10 nm to 10 µm.

In some specific embodiments, the mass percent of the composite particle ranges from 0.01% to 50% of the total mass of the rubber composition, for example, less than 3% of the total mass of the rubber composition. In certain embodiments, the mass percent of the composite particle ranges from 0.05% to 40%, from 0.1% to 35%, from 0.15% to 30%, from 0.20% to 25%, from 0.25% to 20%, from 0.30% to 15%, from 0.40% to 10%, from 0.5% to 7.5%, from 1% to 5%, from 2% to 4% or from 1% to 4% of the total mass of the rubber composition.

In some specific embodiments, the conductive polymer is poly(3,4-ethylenedioxythiophene) (PEDOT), the oxide of silicon is silicon dioxide and the elastomer is a styrene-isoprene rubber. In another specific embodiment, the conductive polymer is polypyrrole, the oxide of silicon is silicon dioxide and the elastomer is a styrene-isoprene rubber.

In yet another specific embodiment, the conductive polymer is poly(3,4-ethylenedioxythiophene) (PEDOT), the composite particle comprises laponite and the elastomer is a styrene-isoprene rubber. In another specific embodiment, the conductive polymer is polypyrrole, the composite particle comprises laponite and the elastomer is a styrene-isoprene rubber.

The aforementioned embodiments find utility in a variety of applications, including as a material used for manufacturing tires. Accordingly, one embodiment provides an article comprising the rubber composition of any of the foregoing embodiments. In some of those embodiments, the article is a tire, a tire component, a belt, a belt component, a hose, a gasket or a film. In one specific embodiment, the article is a tire.

In another specific embodiment, the article is a film. In a more specific embodiment, the film has a sheet resistivity ranging from $1\times10^4$ Ω/sq to $1\times10^8$ Ω/sq. In some embodiments the sheet resistivity ranges from $1\times10^3$ Ω/sq to $1\times10^9$ Ω/sq, from $1 \times 10^2$ Ω/sq to $1 \times 10^8$ Ω/sq, from $1 \times 10^4$ Ω/sq to $1 \times 10^9$ Ω/sq, or from $1 \times 10^3$ Ω/sq to $1 \times 10^8$ Ω/sq.

Additives

To facilitate the polymerization of the conductive polymer, an oxidizing agent may be used. Accordingly, in some embodiments, the composite composition or rubber composition further comprises an oxidizing agent. In some specific embodiments, the oxidizing agent comprises an oxidizing agent selected from the group consisting of a persulfate oxidizing agent, a chlorate oxidizing agent, an oxide oxidizing agent, a chloride oxidizing agent or an elemental oxidizing agent. In some embodiments, the oxidizing agent comprises a material in its elemental form. In one embodiment, the oxidizing agent comprises potassium persulfate, ferric chloride, sodium persulfate, or combinations thereof. In some embodiments, the oxidizing agent is $Na_2S_2O_8$, $K_2S_2O_8$, $FeCl_3$ or $NaClO_3$. In certain specific embodiments, the oxidizing agent is $FeCl_3$.

Other agents can be added to increase desired performance characteristics of the composite or rubber composition. Thus, in some embodiments, the composite or rubber composition further comprises a coupling agent. In some embodiments, the composite composition, rubber composition or dispersion thereof, further comprises a surfactant and/or dispersant.

The final characteristics of the composite or rubber composition can be characterized and measured using techniques well known in the art. Accordingly, in some embodiments, the electrical conductivity of the composite or rubber composition ranges from $10^{-2}$ S/cm to 1 S/cm. In other embodiments, the electrical conductivity of the composite or rubber composition ranges from 10 S/cm to 1000 S/cm. In still other embodiments, the electrical conductivity of the composite or rubber composition ranges from $10^{-2}$ S/cm to 1000 S/cm, from $10^{-1}$ S/cm to 1000 S/cm, from 1 s/cm to 1000 S/cm, from 10 S/cm to 1000 S/cm, from 1 S/cm to 100 S/cm, from 10 S/cm to 100 S/cm or from $10^{-1}$ S/cm to 100 S/cm.

In some related embodiments, the surface conductivity of the composite or rubber composition ranges from $1 \times 10^3$ to $1 \times 10^8$ ohms/sq. In other embodiments, the surface conductivity of the composite or rubber composition is below $1 \times 10^6$ ohms/sq. In still other embodiments, the surface conductivity of the composite or rubber composition ranges from $1 \times 10^3$ to $1 \times 10^7$ ohms/sq, from $1 \times 10^3$ to $1 \times 10^6$ ohms/sq, from $1 \times 10^3$ to $1 \times 10^5$ ohms/sq, from $1 \times 10^3$ to $1 \times 10^4$ ohms/sq, from $1 \times 10^4$ to $1 \times 10^8$ ohms/sq, from $1 \times 10^5$ to $1 \times 10^8$ ohms/sq, from $1 \times 10^6$ to $1 \times 10^8$ ohms/sq, from $1 \times 10^7$ to $1 \times 10^8$ ohms/sq, from $1 \times 10^2$ to $1 \times 10^6$ ohms/sq, from 10 to $1 \times 10^6$ ohms/sq, or from 1 to $1 \times 10^6$ ohms/sq.

Typically the polymerized conductive polymer, composite, or rubber composition is acidic. Accordingly, in one embodiment the pH of the composite or rubber composition ranges from 1 to 6, from 2 to 5, from 2 to 4, or from 6 to 8. In some specific embodiments, the pH of the composite or rubber composition ranges from 1 to 2, from 1 to 3, from 1 to 4, from 1 to 5, from 2 to 8, from 2 to 7, from 2 to 3, from 3 to 8, from 3 to 7, from 3 to 6, from 4 to 8, from 4 to 7, from 4 to 6, from 4 to 5, from 5 to 8, from 5 to 7, from 5 to 6 or from 6 to 7.

Depending on the application (e.g., corrosion resistance) a neutral or basic product may be desired. It has been found that the addition of a neutralizing agent or base can be used to alter the pH of the final product without harm to the performance characteristics of the conductive polymer, composite or the rubber composition.

In some embodiments, the composite or rubber composition further comprises a base. In certain embodiments, the base is a strong base, for example, a base comprising sodium hydroxide, potassium hydroxide, lithium hydroxide, calcium hydroxide, barium hydroxide, or combinations thereof. In yet another example, the base is a weak base, for example, a base comprising ammonia, ammonium hydroxide, pyridine, trimethyl ammonia, or combinations thereof.

The final pH of the conductive polymer, composite or rubber composition can also be adjusted in order to achieve preferred electrical conductivity, solubility or other desired properties of the composite or composition. Suitable methods for measuring the pH of the composite or rubber composition can be used to assess the final pH of the composite or rubber composition and are well known in the art. Accordingly, in some embodiments the final composite or rubber composition is acidic, for example, having a pH less than 7, less than 6, less than 5, less than 4, less than 3, less than 2, or less than 1. In other embodiments, the final composite or rubber composition is basic, for example having a pH greater than 7, greater than 8, greater than 9, greater than 10, greater than 11, greater than 12, greater than 13, or greater than 14.

In addition to adjustments in the pH of the final composite composition or rubber composition, dopants can also be added to embodiments of the compositions disclosed herein. Accordingly, in one embodiment, the composite composition or rubber composition further comprises at least one dopant.

In certain embodiments, the dopant comprises a polymer dopant. In certain embodiments, the polymer dopant is selected from the group consisting of polyethylene, polypropylene, polyvinyl chloride, polystyrene, polyvinyl alcohol, polyimide, polytetrafluoroethylene, polyacrylonitrile, polychloroprene, polysiloxane, polyphosphazene and combinations thereof.

In other embodiments, the dopant comprises a metal dopant. In some embodiments, the metal dopant is selected from the group consisting of zinc, silver, tin and combinations thereof. In still another embodiment, the dopant is selected from the group consisting of silver, nickel, iron, platinum and copper.

In some embodiments, the dopant comprises a combination of polymer dopant and metal dopant. In some embodiments, the dopant is selected from the group consisting of ferric chloride, methyl sulfonic acid, and combinations thereof. In one embodiment, the dopant is a monomer (i.e., a monomer used to synthesize the conductive polymer). In another embodiment, the dopant is an oxide of silicon or clay particle as disclosed herein. In another embodiment, the dopant is an oxidizing agent as disclosed herein (e.g., $FeCl_3$). In some embodiments, the dopant is carbon.

Multiple dopants may be used to create unique physical and chemical properties of the composite or rubber composition. Dopant concentration can be defined relative to the total composite or rubber composition. As such, in some embodiments, the composite or rubber composition comprises one or more dopants and the sum of the masses of all dopants ranges from 0.01% to 5% of the total mass of the composite or rubber composition. In another embodiment, the composite or rubber composition comprises one or more dopants and the sum of the masses of all dopants ranges from 0.05% to 4.5%, from 0.1% to 4.2%, from 0.15% to 4%, from 0.2% to 3.7%, from 0.25% to 3.5%, from 0.5% to 3%, from 1% to 3%, from 1% to 2% or from 3% to 4% of the total mass of the composite or rubber composition.

In other embodiments, the sum of the masses of all dopants ranges from 0.01 to 0.1 wt % or 0.05 to 0.1 wt % of the composite particles. In other embodiments, the concentration of the dopant ranges from 0.1 to 5 wt %, 1 to 10 wt %, 5 to 20 wt % or 10 to 30 wt % of the composite particles.

The skeletal density of the composite particles may be assessed using helium pycnometry, as known to those skilled in the art. The skeletal density of the composite particles in some embodiments may range from 0.1 g/cc to 10 g/cc. In certain embodiments, the skeletal density of the composite particles is below 0.2 g/cc, below 0.3 g/cc, below 0.4 g/cc, below 0.5 g/cc, below 0.6 g/cc, below 0.7 g/cc, below 0.8 g/cc, below 0.9 g/cc, below 1.0 g/cc, below 1.1 g/cc, below 1.2 g/cc, below 1.3 g/cc, below 1.4 g/cc, below 1.5 g/cc, below 1.6 g/cc, below 1.7 g/cc, below 1.8 g/cc, below 1.9 g/cc, below 2.0 g/cc, below 2.1 g/cc or below 2.2 g/cc. In still other embodiments, the skeletal density of the composite particles is below 2.5 g/cc, below 3.0 g/cc, below 3.5 g/cc, below 4.0 g/cc, below 5.0 g/cc, below 7 g/cc or below 10 g/cc.

Not wanting to be bound by theory, the surface area of the oxide of silicon, clay particles or the composite particles may be modified in order to provide increased conductivity. Accordingly, in one embodiment the composite or clay particles have a BET surface area of at least 1 $m^2/g$, at least 2 $m^2/g$, at least 3 $m^2/g$, at least 4 $m^2/g$, at least 5 $m^2/g$, at least 6 $m^2/g$, at least 7 $m^2/g$, at least 8 $m^2/g$, at least 9 $m^2/g$ or at least 10 $m^2/g$. In other embodiments, the composite or clay particles have a BET surface area of at least 50 $m^2/g$, at least 100 $m^2/g$, at least 150 $m^2/g$, at least 200 $m^2/g$, at least 250 $m^2/g$, at least 300 $m^2/g$, at least 350 $m^2/g$, at least 400 $m^2/g$, at least 450 $m^2/g$ or at least 500 $m^2/g$. In yet another embodiment, the composite or clay particles have a BET surface area of at least 1000 $m^2/g$.

In some embodiments, the diameter the composite or clay particles can impact the ability of the composite or rubber composition to stay suspended in solution. Additionally, the diameter of the composite or clay particles will play a role in the diffraction of light which is directly related to haze. The diameter of particles can be measured using methods known in the art, such as laser scattering techniques. Accordingly, in some embodiments, the composite or clay particles have a D(50) particle size ranging from 10 to 1000 nm, from 10 to 500 nm, from 20 to 300 nm, from 20 to 50 nm, from 50 to 200 nm, or from 100 to 150 nm. In another embodiment, the D(50) particle size of the composite or clay particles is about 200 nm. In other embodiments, the D(50) particle size of the composite or clay particles ranges from 200 to 1000 nm, from 200 to 500 nm, from 200 to 400 nm, or from 250 to 300 nm. In still another embodiments, the D(50) particle size of the composite or clay particles is less than 10 nm or greater than 1000 nm. In yet other embodiments, the D(50) particle size of the composite or clay particles is between 1000 nm and 5000 nm. In certain specific embodiments, the D(50) particle size of the composite or clay particles is less than 500 nm. In more specific embodiments, the D(50) particle size of the composite or clay particles is less than 100 nm.

In some embodiments, the composite or clay particles may be purposefully functionalized in order to impart desirable characteristics to the composite or rubber composition (e.g., mechanical stability, disperability, surface adhesion, solubility). Not wanting to be bound by theory, the composite or clay particle functionality may determine, at least in part, the physical and chemical adhesion to matrix material surfaces and/or dispersability within matrix material(s) or elastomer. The functionality of the composite or clay particles can be identified using infrared spectroscopy, or any other methods known to those of skill in the art. In one embodiment, the functionality comprises a substituent selected from hydroxyl, carbonyl, aldehyde, carbonate, carboxylate, carboxylic acid, ester (e.g., activated ester), amide, amine, imine, azide, alkynyl fluoroalkyl, or combinations thereof. In another embodiment, the substituent comprises silicon, such as a silyl or disilanyl substituent (e.g., an aminoalkylsilylether).

The inclusion of impurities or unreacted precursors (e.g., monomer) could negatively affect the optical and mechanical properties of the final rubber composition. The presence and concentration of such impurities can be determined with thermal gravimetric analysis, or any other methods known by those skilled in the art. In some embodiments, the concentration of impurities in the composite or rubber composition ranges from 0 to 1 wt %, 0 to 2 wt %, 0 to 3 wt %, 0 to 4 wt %, or 0 to 5 wt % of the composite or rubber composition. In another embodiment, the concentration of impurities is approximately 0.5 wt % of the composite or rubber composition. In other embodiments, the concentration of impurities ranges from 1 to 5 wt %, 2 to 4 wt %, or 2 to 3 wt % of the composite or rubber composition. In still another embodiment, the concentration of impurities is less than 1 wt % or greater than 5 wt % of the composite or rubber composition. In still another embodiment, the concentration of impurities ranges from 5 to 30%, 5 to 20%, or 10 to 15% of the composite or rubber composition.

In some embodiments, the amount of individual trace elements can be determined using inductively coupled plasma optical emission spectrometry (ICP-OES), as known to those skilled in the art. In some embodiments, the level of scandium present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of titanium present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of vanadium present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of chromium present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of manganese present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of iron present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of cobalt present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of nickel present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of copper present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of zinc present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of silver present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of molybdenum present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of platinum present in the composite or rubber composition is less than 10000 ppm, less than 5000 ppm, less than 1000 ppm, less than 500 ppm, less than 100 ppm, less than 10 ppm, or less than 1 ppm.

In some embodiments, the level of cadmium present in the composite or rubber composition is less than 10000 ppm, less than 5000 ppm, less than 1000 ppm, less than 500 ppm, less than 100 ppm, less than 10 ppm, or less than 1 ppm.

In yet other embodiments, the sum of all impurities as determined by ICP-OES, excluding dopants, present in the composite or rubber composition is less than 100,000 ppm, less than 20,000 ppm, less than 10,000 ppm, less than 5000 ppm, less than 1000 ppm, less than 500 ppm, less than 100 ppm, or less than 10 ppm.

Select elements may be present in the material which may impact performance properties, such as electrical or thermal conductivity or mechanical strength. The quantity of an element can be measured using EDS or other methods known by those in the art.

In some embodiments, the atomic level of manganese present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of aluminum present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of iron present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of silicon present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of nickel present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of lithium present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of magnesium present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of zinc present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of sodium present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of oxygen present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of carbon present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

In some embodiments, the atomic level of sulfur present in the composite or rubber composition is less than 80%, less than 70%, less than 60%, less than 50%, less than 40%, less than 30%, less than 20%, less than 10%, less than 8%, less than 5%, less than 2%, less than 1%, less than 0.8%, less than 0.5%, less than 0.2%, less than 0.1%, or less than 0.05%.

The concentration and identity of the components in the composite or rubber composition can be linked to the viscosity. In some embodiments, the viscosity of the composite or rubber composition ranges from 0.5 to 100 cP, from 1 to 10 cP, from 1 to 5 cP, or from 1 to 2 cP. In other embodiments, the viscosity of the composite or rubber composition ranges from 10 to 100 cP, from 10 to 50 cP, or from 20 to 30 cP. In one embodiment, the viscosity of the composite or rubber composition is about 1.2 cP.

In some embodiments, the composite composition or rubber composition is mixed with a carrier fluid thereby creating a dispersion. In certain embodiments, the composition further comprises a carrier fluid selected from the group consisting of toluene, acetone, xylene, methanol, ethanol, isopropanol, water and combinations thereof. In some embodiments, the carrier fluid comprises an organic solvent. In one embodiment, the organic solvent is acetone, ethanol, methanol, isopropanol, toluene, xylene, methyl ethyl ketone, benzene, ethylene glycol, diethylene glycol, triethylene glycol, or butyl cellusolve. In certain embodiments, the carrier fluid comprises water. In some embodiments, the rubber composition further comprises a carrier fluid selected from the group consisting of toluene, acetone, xylene, methanol, ethanol, isopropanol, water and combinations thereof.

In some of the foregoing embodiments, the composition or dispersion further comprises a surfactant. In certain embodiments, the composition or dispersion further comprises a dispersant.

In some of those embodiments, the carrier fluid further comprises commercial additives and rheology modifiers, for example, including but not limited to Dynol, Rhoplex HA-16, Eastman 349 W, Rhoplex WL-51, and Paraloid B66 DMC.

In some embodiment, to promote coating and wettability the dispersion the carrier fluid further comprises a surfactant, a dispersant or a wetting agent. In one embodiment, the surfactant may be Span 20, Span 40, Span 60, Span 80, Span 83, Span 85, Span 120, Tween 20, Tween 21, Tween 40, Tween 60, Tween 61, Tween 65, Tween 80 or AFCONA-3585. In still another embodiment, the surfactant is non-ionic, zwitterionic, cationic, anionic or combinations thereof. In certain embodiments, the concentration of surfactant ranges from 0.05 to 5 wt % of the weight of the carrier fluid. In another embodiment, the concentration of surfactant ranges from 0.01 and 50 wt %, 0.01 and 25 wt %, 0.01 and 10 wt %, 0.1 and 5 wt %, 0.1 and 2 wt % or 0.5 and 2 wt % of the carrier fluid.

The dispersion can be used for application of the composite composition or rubber composition thereby forming a film on a substrate (e.g., comprising polyethylene terephthalate). Thus, one embodiment provides a substrate comprising a composite or rubber composition as disclosed herein on a surface thereof. In some embodiments, the surface comprises a film of the composite or rubber composition. In certain embodiments, the film has a thickness ranging from 25 to 250 μm.

The concentration of the composite or rubber composition in a solvent (i.e., a dispersion) can impact the film thickness and the ease of application to substrates. If the concentration is too high, the dispersion may be difficult to use or may apply a film that is undesirably thick. In one embodiment, the concentration of the composite or rubber composition in a dispersion ranges from 0.1 and 10 wt %, from 0.5 and 5 wt %, from 1 and 2 wt %, from 5 and 9 wt %, from 6 and 8 wt % of the total dispersion. In certain embodiments, the concentration of the composite or rubber composition in the dispersion is approximately 1.5 wt % of the total dispersion. In yet another embodiment, the concentration composite or rubber composition in the dispersion is greater than 10 wt % of the total dispersion. In still another embodiment, the concentration of the composite or rubber composition in the dispersion is less than 0.1 wt % of the total dispersion.

Not wanting to be bound by theory, the pH of the dispersion can impact both the adhesion and the safety of the rubber composition. In the some embodiments, the pH of the dispersion is approximately 7. However, there may be substrates or environments which require significantly acidic or basic solutions. In another embodiment, the pH of the dispersion ranges from 2 and 11, from 2 and 7, from 3 and 6, from 4 and 5, from 7 and 11 or from 8 and 10.

In some embodiments, a film comprising the composite of embodiments or the composition of embodiments described herein is provided. Some related embodiments provide a transparent or semi-transparent substrate comprising a composite, composite composition or rubber composition described herein on a surface thereof. In some embodiments, transparent or semi-transparent substrates comprise silicon-containing glass, plastics, transparent ceramics, polymers, or combinations therein. In some embodiments, transparent surfaces or substrates include windows, single pane windows, double pane windows, car windows, residential windows, commercial windows, water bottles, light bulbs, computer screens, and watch or phone faces. In some embodiments, the substrate comprises polyethylene terephthalate.

Once applied to a window or semi-transparent surface the composite or rubber composition can be further characterized as a film. For all optical property measurements (i.e., haze, transmission, absorption, reflection, etc.) the film thickness is assumed to be uniform and constant at 200 nm thick. All values of performance are normalized to the semi-transparent to transparent substrate. For example, the transmission in the visible spectra is at 80% indicates a 20% reduction in visible light through the substrate.

The goal for an effective coating is to allow for the highest percentage of visible light to be transmitted through the film. The wavelength of visible light is defined to fall between 350 and 750 nm, as known in the art. In one embodiment, the transmission of visible light through the film ranges from 70 to 100%. In some embodiments, the transmission of visible light through the film ranges from 80 to 100%, from 80 to 90%, from 90 to 95%, or from 70 to 80%. In certain embodiments, the transmission of visible light through the film ranges from 80 to 100%. In yet another embodiment, the transmission of visible light is below 70%.

Another important goal for an effective film is the ability for the film to absorb ultraviolet (UV) radiation. The wavelength of UV radiation is defined as below 350 nm. In one embodiment, the absorption of UV radiation by the film ranges from 25 to 100%. In another embodiment, the absorption of UV radiation by the film ranges from 30 to 90%, from 35 to 80%, from 40 to 60%, or from 45 to 55%. In yet another embodiment, the absorption of UV radiation by the film is 50% or below 25%.

Yet another important goal for an effective film is the ability for the film to absorb infrared (IR) radiation. The wavelength of IR radiation is defined as above 750 nm. In one embodiment, the absorption of IR radiation by the film ranges from 25 to 100%. In another embodiment the absorption of IR radiation by the film ranges from 30 to 90%, from 35 to 80%, from 35 to 60% or from 35 to 50%. In yet another embodiment the absorption of IR radiation by the film is 40%.

Yet another important goal for an effective film is the ability for the film to reflect infrared (IR) radiation. In one embodiment, the reflection of IR radiation by the film ranges from 20 to 100%. In another embodiment, the reflection of IR radiation by the film ranges from 20 to 90%, from 20 to 80%, from 20 to 60% or from 20 to 50%. In yet another embodiment the reflection of IR radiation by the film is 30%.

To compare two films with differing transmission, absorption, and reflection spectra, figures of merit are defined. The transmission figure of merit is defined as the integral of the transmission spectrum from 350 to 750 nm (visible) divided by the integral of the transmission spectrum from 750 to 2500 nm (infrared). A larger transmission figure of merit corresponds to better performance.

$$FOM_T = \frac{\int_{350}^{750} \text{Transmission}}{\int_{750}^{2500} \text{Transmission}}$$

In some embodiments the film has a $FOM_T$ ranging from 0.1 to 1, from 0.2 to 1, from 0.5 to 1, from 0.8 to 0.9, or from 0.25 to 0.9. In another embodiment, the $FOM_T$ ranges from 0.2 to 0.3 or from 0.25 to 0.29. In other embodiments, the $FOM_T$ ranges from 0.7 to 0.95, from 0.75 to 0.9, or from 0.8 to 0.85.

The absorption figure of merit is defined as the integral of the absorption spectrum from 750 to 2500 nm divided by the integral of the absorption spectrum from 350 to 750 nm. A larger absorption figure of merit corresponds to better performance.

$$FOM_A = \frac{\int_{750}^{2500} \text{Absorption}}{\int_{350}^{750} \text{Absorption}}$$

In one embodiment, the film has a $FOM_A$ ranging from 1 to 20, from 2 to 15, from 5 to 10, from 8 to 9, from 8 to 12, or from 9 to 10. In another embodiment, the film has a $FOM_A$ ranging from 10 to 12, from 10 to 15, or from 10 to 20.

The reflection figure of merit is defined as the integral of the reflection spectrum from 750 to 2500 nm divided by the integral of the reflection spectrum from 350 to 750 nm. A larger reflection figure of merit corresponds to better performance.

$$FOM_R = \frac{\int_{750}^{2500} \text{Reflection}}{\int_{350}^{750} \text{Reflection}}$$

In one embodiment, the film has a $FOM_R$ ranging from 1 to 20, from 2 to 15, from 5 to 10, from 8 to 9, from 5 to 12, or from 9 and 10. In another embodiment, the film has a $FOM_R$ ranging from 10 to 12, from 10 to 15, or from 10 to 20.

The complete transmission, absorption and reflection of the film can be assessed through the product of the three components.

$$TAR = FOM_T \times FOM_A \times FOM_R$$

One embodiment provides a film having a TAR ranging from 5 to 280. In some embodiments, the film has a TAR ranging from 5 to 20, from 20 to 50, from 50 to 70, from 70 to 100, from 100 to 150, from 150 to 200, from 200 to 280. In another embodiment, the TAR is approximately 75.

There are cases and applications wherein the absorption and the reflection of the film should be similar to each other. For example, a material may have a high TAR value, wherein the absorption value is low due to a high reflection. The ratio between reflection and the absorption can be defined using the following equation:

$$R/A = |1 - FOM_R/FOM_A|$$

When the R/A is low, the reflection and absorption of the film are similar. When the R/A is high, the reflection and absorption of the film are drastically different. In one embodiment, the film has an R/A ranging from 0 to 5. In other embodiments, the R/A ranges from 0.01 to 0.5, from 0.1 to 0.4, or from 0.2 to 0.3. In yet another embodiment, the film has an R/A greater than 0.5. In still another embodiment, the film has an R/A that is approximately 0.

There are cases and applications wherein the absorption and the reflection of the film should be similar to each other. For example, a material may have a high TAR value, wherein the transmission value is high and the absorption value is low. The ratio between transmission and the absorption can be defined using the following equation:

$$T/A = |1 - FOM_T/FOM_A|$$

When the T/A is close to zero, the transmission and absorption of the film are similar. When the T/A is greater than zero, the absorption of the film is greater than the transmission. When the T/A is less than zero, the transmission of the film is greater than the absorption of the film. In one embodiment, the R/A ranges from 0 to 5. In another embodiment, the R/A ranges from 0.01 to 0.5, from 0.1 to 0.4, from 0.2 to 0.3. In yet another embodiment, the R/A is greater than 0.5. In still another embodiment, the R/A is approximately 0.

Haze is an important measurement of the film's diffractive qualities and is known to those familiar with the art. An undesired high value for haze will make images blurry or deformed. A low value for haze is preferred in some embodiments for optimal coatings. In one embodiment, the haze of the film ranges from 0 to 5%. In another embodiment, the haze of the film ranges from 0 to 4%, from 0 to 3%, from 0 to 2%, from 0 to 1%, from 0 to 0.5%. In yet another embodiment, the haze of the film is approximately 0.5%. In another application, it may be preferred that the haze is high, purposefully distorting the transmission of light. In one embodiment, the haze of the film ranges from 5% to 20%.

In one embodiment the color rendering index of the film ranges from 0.5 to 1. In another embodiment, the color rendering index of the film ranges from 0.6 to 1, from 0.7 to 1, from 0.8 to 1 or from 0.9 to 1. In still another embodiment, the color rendering index of the film is greater than 0.9. In yet another embodiment, the color rendering index of the film is approximately 0.95.

In addition to having optical performance properties the film will also provide thermal insulating effects. The thermal impacts can be measured using metrics known to those in the art.

The U-factor describes the ability for the window or film to prevent heat from escaping. It is a measurement of the rate of heat transfer. The film can be designed to allow for high heat transfer (high U-factor) or high heat retention and low transfer (low U-factor). In one embodiment, the film has a U-factor ranging from 0.05 to 1.5 BTU/sf/hr/° F. In other embodiments, the film has a U-factor ranging from 0.1 to 0.8 BTU/sf/hr/° F., from 0.1 to 0.5 BTU/sf/hr/° F., from 0.2 to 0.6 BTU/sf/hr/° F., from 0.3 to 0.8 BTU/sf/hr/° F., or from 0.3 to 0.5 BTU/sf/hr/° F. In yet another embodiment, the film has a U-factor that is approximately 0.4 BTU/sf/hr/° F. In still another embodiment, the film has a U-factor that allows for high heat transfer and ranges from 0.8 to 1.5 BTU/sf/hr/° F., from 1 to 1.4 BTU/sf/hr/° F., or from 1.2 to 1.3 BTU/sf/hr/° F.

Yet another thermal property of the film is the temperature of the outside of the window wherein condensation is formed on the inside of the window. Not wishing to be bound by theory, the threshold exterior temperature for interior condensation is typically desired to be as low as possible, allowing for windows to be more effective in cold climates. In one embodiment, the threshold exterior temperature for interior condensation ranges from −30 to 20° C. In another embodiment, the threshold exterior temperature for interior condensation ranges from −20 to 10° C. or from −10 to 0° C. In yet another embodiment, the threshold exterior temperature for interior condensation is approximately −5° C.

Thin coatings and films can be further characterized by the adhesion testing using ASTM D3359 method for measuring adhesion by scoring and tape test. The methods and classification using ASTM D3359 is well known to those in the art. In one embodiment, the film is classified as 5B (0% removed), 4B (less than 5% removed), 3B (between 5 and 15% removed), 2B (between 15 and 35% removed), 1B (between 35 and 65% removed), or 0B (greater than 65% removed).

In the summer, the end user may choose to apply the coating to the exterior of a window to block UV and IR energy from entering conditioned spaces. Extreme outdoor conditions may contribute to the degradation of the film and result in decreased performance. To replicate standard environmental stresses, including elevated temperature and humidity, accelerated environmental stability tests may be conducted according to ISO 4892. After subjecting films to these accelerated stresses, the above characterizations may be repeated to determine the effect on performance. In one embodiment, performance of the film is decreased by 8%, by 9%, by 10%, by 11%, by 12%, by 13%, by 14%, by 15%, by 20%, by 25% or by 30%.

As the film may be applied to transparent surfaces, such as windows in high traffic areas, there is the chance that the film may be inadvertently scratched. The scratch/abrasion resistance of the film can be evaluated with a scratch apparatus as described in ISO 1518. Not wanting to be bound by theory, from this test, the minimum force to penetrate the film through to the underlying substrate is determined. In one embodiment, the minimum load to scratch the film is 2 N, 3 N, 4 N, 5 N, 6 N, 7 N, 8 N, 9 N, 10 N, 11 N, 12 N, 13 N, 14 N, 15 N, 16 N, 17 N, 18 N, 19 N or 20 N. In one specific embodiment, the minimum load to penetrate the film through to the substrate is 12 N.

The film may be exposed to extreme condition, such as elevated temperatures. In order to remain effective, the film needs to undergo minimal degradation or material loss when exposed to high temperature. Not wanting to be bound by theory, the thermal degradation onset is defined as the temperature at which 5% of the film is removed according to thermo-gravimetric analysis in nitrogen. In one embodiment, the thermal degradation onset temperature of the film ranges from 100° C. to 500° C. In another embodiment, the thermal degradation onset temperature of the film ranges from 100° C. to 400° C., from 125° C. to 400° C., from 150° C. to 350° C. or from 200° C. to 300° C. In still another embodiment, the thermal degradation onset temperature of the film ranges from 250° C. to 350° C., from 275° C. to 350° C. or from 300° C. to 325° C. In yet another embodiment, the thermal degradation onset temperature of the film ranges from 400° C. to 500° C.

In addition to high performance, the composite, rubber composition, dispersant and/or film can also be designed to be safe for children and pets in the case of inadvertent ingestion. As known by those skilled in the art, Lethal Dose, 50% (LD50 or $LD_{50}$) is a measurement of the amount of a substance required to kill 50% of a test population. For the LD50 values herein, the test population is adult rats. In one embodiment, the LD50 for the composite, rubber composition, dispersant and/or film ranges from 0.0001 g/kg to 1000 g/kg. In another embodiment, the LD50 for the composite, rubber composition, dispersant and/or film ranges from 0.01 g/kg to 50 g/kg, from 0.1 g/kg to 5 g/kg or from 0.5 g/kg to 2 g/kg. In yet another embodiment, the LD50 for the composite, rubber composition, dispersant and/or film ranges from 5 g/kg to 1000 g/kg, from 10 g/kg to 100 g/kg, from 10 to 50 g/kg, or from 20 to 40 g/kg.

Some embodiments of the current disclosure are directed towards composites or rubber compositions having optimized electrical conductivity or electrostatic discharge characteristics. Embodiments also include films useful for the same. For example, the composites, rubber compositions and films can be used to coat electrical components and other devices requiring an electrically conductive coating. In some embodiments, the electrical conductivity of the composite, rubber composition or film may ranges from $10^{-4}$ to $10^8$ S/cm or from $10^{-4}$ to $10^3$ S/cm. In one embodiment, the electronic conductivity of the composite, rubber composition or film ranges from 1 S/cm to $10^3$ S/cm, from 1 S/cm to $10^2$ S/cm, or from 50 S/cm to 100 S/cm. In another embodiment, the electronic conductivity of the composite, rubber composition or film ranges from $10^{-4}$ S/cm to 10 S/cm, from $10^{-3}$ S/cm to 1 S/cm or from $10^{-2}$ S/cm to 1 S/cm. In one embodiment, the electronic conductivity of the composite, rubber composition or film, in the absence of the carrier fluid ranges from 0.001 to 1000 S/cm, from 1 to $10^3$ S/cm, from 1 to $10^2$ S/cm or from 50 to 100 S/cm. In some embodiments, the electronic conductivity of the composite, rubber composition or film ranges from $10^{-4}$ to 10 S/cm, from $10^{-3}$ to 1 S/cm or from $10^{-2}$ to 1 S/cm.

For applications which require charge dissipation, the surface resistivity of the composite, rubber composition or film is a critical component. Accordingly, in one embodiment the surface resistivity of the composite, rubber composition or film ranges from $1\times10^4$ to $1\times10^5$ ohms/sq, from $1\times10^5$ to $1\times10^6$ ohms/sq, from $1\times10^6$ to $1\times10^7$ ohms/sq, from $1\times10^7$ to $1\times10^8$ ohms/sq, from $1\times10^8$ to $1\times10^9$ ohms/sq, or from $1\times10^9$ to $1\times10^{10}$ ohms/sq. In another embodiment, the surface resistivity of the composite, rubber composition or film ranges from $1\times10^4$ to $1\times10^7$ ohms/sq. In yet another embodiment the surface resistivity of the composite, rubber composition or film is highly conductive and below $1\times10^4$ ohms/sq. For example, in some embodiments, the electrical conductivity ranges from $10^{-4}$ to $10^8$ S/cm, from $10^{-4}$ to $10^3$ S/cm, from 1 S/cm to $10^3$ S/cm, from 1 S/cm to $10^2$ S/cm, or from 50 S/cm to 100 S/cm and the surface resistivity is below $1\times10^4$ ohms/sq. In other embodiments, the electrical conductivity ranges from $10^{-4}$ to $10^8$ S/cm, from $10^{-4}$ to $10^3$ S/cm, from 1 S/cm to $10^3$ S/cm, from 1 S/cm to $10^2$ S/cm or from 50 S/cm to 100 S/cm and the surface resistivity is greater than $1\times10^{10}$ ohms/sq.

Method of Preparing the Composition

In one embodiment, one or more monomers are used for preparing the conductive polymer, which can be chosen from a range of materials known in the art. Not wishing to be bound by theory, the monomer(s) can be important to imparting the electronic characteristics (e.g., conductivity, dissipation), optically transparent properties and the dispersibility of the final composite or rubber composition. Accordingly, one embodiment provides a method for preparing a rubber composition, the method comprising admixing a monomer, a plurality of particles comprising a silicon oxide and an oxidizing agent, thereby polymerizing the monomer to form a plurality of composite particles, the composite particles comprising a conductive polymer on the surface of one of the silicon oxide-containing particles, and combining the plurality of composite particles with an elastomer.

Another embodiment provides a method for preparing the composite of any one of the foregoing embodiments, the method comprising admixing a plurality of clay particles, a monomer and an oxidizing agent, thereby polymerizing the monomer and depositing a conductive polymer on surfaces of the clay particles.

In certain embodiments, the monomer is pyrrole or 3,4-ethylenedioxythiophene, the clay particle comprises laponite and the oxidizing agent is $FeCl_3$. In another embodiment, the monomer is aniline, pyrrole, 9-fluorenone, fluorene, thiophene or combinations thereof. In some embodiments, the monomer is selected from the group consisting of optionally substituted aniline, pyrrole, thiophene, acetylene, phenylene, vinylene, phenylene sulfide, carbazole, indole, azepine, fluorene, phenylene, pyrene, azulene, or naphthalene. In certain embodiments, the conductive polymer comprises 9-fluorenone monomer. In certain embodiments, the monomer is 3,4-ethylenedioxythiophene, pyrrole or 9-fluorenone. In some of those embodiments, the oxidizing agent is $Na_2S_2O_8$, $K_2S_2O_8$, $FeCl_3$ or $NaClO_3$.

Additional steps and components may be added to create novel variations. For example, a dopant may be added at any time during the methods described in the foregoing embodiments.

In some embodiments, the conductive polymer can be purchased from common commercial agencies and further modified.

The conductive polymer can interact or adhere (e.g., adsorb) to the surface of the oxide of silicon or clay particle. Accordingly, in some embodiments, the conductive polymer is grafted to, coupled with, grown from or physically adsorbed to a surface of the oxide of silicon or clay particles. The interaction between the conductive polymer and the oxide of silicon or clay particles (e.g., covalent linkage, adsorption) can be accomplished using a variety of techniques that are well known in the art. For example, in one embodiment, the method comprises functionalizing the conductive polymer and the oxide of silicon of clay particle with complementary coupling agents (e.g., activated ester/amine, isocyanate/amine, thiol/maleimide, amine/aldehyde, silane/halide), mixing the functionalized conducting polymer and functionalized oxide of silicon or clay particles and initiating a coupling reaction thereby forming a covalent linkage between the conductive polymer and the oxide of silicon or clay particles.

In some embodiments, the elastomer or matrix material is dissolved, swelled or melted prior to combining.

In some of the foregoing embodiments, the method further comprises adding a dopant. In certain embodiments, the oxide of silicon or clay particles, oxidizing agent and monomer are added sequentially, resulting in a physical mixture. In some embodiments, a solvent is added. In some embodiments, the dopant is added before the monomer is added. In some embodiments, the dopant is added after the monomer is added.

The solvent used for synthesis can be altered for safety for both the user and the environment. In some embodiments, the solvent for synthesis comprises water. In some embodiments, the solvent comprises non-aqueous fluids, such as ethanol, acetone, methanol, toluene, isopropanol, benzene, or combinations thereof.

The concentration of monomer is chosen to facilitate the reaction with other optional agents (e.g., dopant, oxidizing agent). In one embodiment, the concentration of monomer in solution ranges from 0.05 M to 5 M. In other embodiments, the concentration of monomer in solution ranges from 0.05 M to 1 M, 0.1 M to 0.9 M, 0.5 M to 0.9 M, 1 M to 4 M, or 2 M to 3 M. In certain embodiments, the concentration of monomer in solution is less than 0.05 M or greater than 5 M. In still yet another embodiment, the concentration of monomer in solution is 0.08 M.

Oxidizing agents (e.g., for use as polymerization initiators) generally refer to a large class of materials, some of which are listed in Table 1. Table 1 is illustrative list for exemplary purposes and not exhaustive. Oxidizing agents will be apparent to those skilled in the art. The oxidizing agent may be chosen based on its reaction rate, solubility, and cost. In one embodiment, more than one oxidizing agent is used. In an additional embodiment, no oxidizing agent is used. In still other embodiments, an oxidizing agent comprising sodium, iron, silver, aluminum, potassium, nickel, copper, chromium, manganese, calcium, zinc, tin, titanium or combinations thereof is provided.

TABLE 1

| Category | Exemplary oxidizing agents |
|---|---|
| | Example agents |
| Sulfates | Potassium persulfate, sodium persulfate, barium sulfate, ammonium persulfate |
| Chlorates/Chlorides | Ammonium perchlorate, sodium perchlorate, sodium chlorate, potassium perchlorate, calcium hypochlorate, calcium chlorate, ferric chloride, silver chloride |
| Oxides | Barium peroxide, dibenzoyl peroxide, hydrogen peroxide, magnesium peroxide, nitrogen trioxide, potassium peroxide, sodium peroxide, perchloric acid |
| Elemental | Oxygen, fluorine, bromine |

The ratio between monomer and the oxidizing agent may impact the rate and extent of the polymerization reaction. For example, in some embodiments, the molar ratio of monomer to oxidizing agent ranges from 5:1 to 1:5, 1:1 to 5:1, 2:1 to 3:1, 1:1 to 1:5, or 1:2 to 1:3. In another embodiment, the molar ratio of monomer to oxidizing agent is about 1:1.

For preparation methods described herein, mixing of processes and solutions can be heated or cooled to directly impact the rate of reaction. In some embodiments, the temperature of the mixing is increased above 30° C., above 40° C., above 50° C., above 60° C., above 70° C., above 100° C., above 150° C., above 200° C., or above 300° C. In other embodiments, the temperature of the mixing is decreased below 30° C., below 20° C., below 10° C., or below 0° C. In still another embodiment, the temperature is held constant throughout the method. In yet another embodiment the temperature of the mixing is dynamic.

The time allowed for the preparation of the composite particles (i.e., polymerization) can be controlled to obtain ideal particle size. For example, in some embodiments the polymerization time ranges from 5 minutes to 48 hours. In some embodiments, the polymerization time ranges from 5 minutes to 10 hours, 30 minutes to 8 hours, 1 hour to 5 hours, or 2 hours to 4 hours. In another embodiment, the polymerization time is approximately 3 hours. In other embodiments, the polymerization time ranges from 10 hours to 48 hours, 12 hours to 24 hours, or 16 hours to 20 hours. In still another embodiment, the polymerization time is greater than 48 hours.

The oxidizing agent is typically added into solution after the combination of monomer and the oxide of silicon or clay particle, though it can also be added after the combination and the polymerization of monomer and oxide of silicon or clay particle. In some embodiments, the concentration of oxidizing agent relative to the total mass of the composite particles and solvent ranges from 0.001 to 1 wt %, 0.01 to 0.1 wt %, or 0.05 to 0.1 wt %. In other embodiments, the concentration of oxidizing agent ranges from 0.1 to 5 wt %, 1 to 10 wt %, 5 to 20 wt %, or 10 to 30 wt %.

In some embodiments, the method further comprises neutralizing using an acid or base and drying the composite. In some embodiments, the composite is dried using vacuum filtration, centrifuged, air dried, oven dried, or freeze dried. In another embodiment, the composite may never undergo a drying phase. In certain embodiments, the composite may undergo a continuous solvent exchange.

One specific embodiment provides a method for reducing the UV or IR transmission, or both, of a transparent or semi-transparent substrate, the method comprising applying a composite, rubber composition or a dispersion as described herein on a surface of the substrate. The composite, rubber composition or dispersion may be applied directly or indirectly to a transparent or semi-transparent surface or substrate.

In some embodiments, the application of the composite, rubber composition or dispersion to a surface or substrate is through mechanical spraying. In some embodiments, the composite, rubber composition or dispersion is sprayed using an aerosol canister. In other embodiments, the composite, rubber composition or dispersion is sprayed using a non-aerosol spray bottle.

In some embodiments, the application of the composite, rubber composition or dispersion to a surface or substrate is through mechanical wiping. In yet another embodiment, the application of the composite, rubber composition or dispersion to a surface or substrate is through pouring and no additional wiping or spreading is required. In still another embodiment, the composite, rubber composition or dispersion is applied directly to a rag, cloth, or brush and applied through mechanical transfer. In other embodiments, the composite, rubber composition or dispersion is applied through a doctor blade, painting method, mechanical spreading technique, or extrusion process. In some embodiments, the composite, rubber composition or dispersion is applied using a dip coating process.

The composite, rubber composition or dispersion may be applied directly or indirectly to a surface. In one embodiment, a film of the composite or rubber composition as described herein is formed as a result of the methods. After application, the film may need to undergo additional processing steps in order to reach desired performance properties. For example, the film may need to dry to remove excess carrier fluid. In one embodiment, the carrier fluid is removed through ambient temperature air dry. In another embodiment the carrier fluid is removed through forced air or elevated temperature drying. The film may also require additional curing for proper adhesion and flexibility. Curing may occur before or after carrier fluid removal. In one embodiment, the film is cured using thermal assistance or UV assistance.

Other embodiments, of the present disclosure include the use of the disclosed composite or rubber composition in an electronic device. In some embodiments, the electronic device is a CPU or motherboard. In other embodiments, the electronic device is an airplane, automobile, bicycle, or motorcycle. In still other embodiments, the electronic device is a computer, tablet, or faceplate.

Users may choose to remove the film once the transparent substrate is no longer in service, repurposed, or in need of repairs. Additionally, the user may choose to seasonally apply and remove the film as the exterior temperature dictates. In one embodiment, the film can be removed when exposed to an acidic solution, a basic solution, organic solvents, or water. In another embodiment the film can be removed by common commercially available cleaning supplies, such as Windex. In still another embodiment, the film is removed through mechanical wiping of the film using a rag or cloth containing the appropriate solvent.

Embodiments of the present disclosure overcome limitations of previously described, existing rubber compositions, and provides a number of other improvements. For example, embodiments of the composite or rubber composition have may a relatively low viscosity when dissolved in a carrier fluid (i.e., as a dispersion) allowing the dispersion to be easily applied to a variety of substrates. Furthermore, the resultant film is more effective than previously known materials at reducing the overall UV and IR transmission while keeping optical transmission high, as it can be applied as a thin uniform coating. Furthermore, by altering the functionality of the conductive polymer, oxide of silicon or clay particles and/or the elastomer, the dispersion can be designed to increase adhesion and scratch resistance to a wide range of transparent substrates.

The composite particles can be incorporated with elastomer using a number of techniques known by one skilled in the art. In some embodiments, the methods of incorporation to form the final rubber composition involve mechanical mixing solids. In other embodiments, the methods of incorporation to form the final rubber composition involve dispersion within a liquid.

The methods to form the final rubber composition depend on the initial form factor of the composite particles and elastomer. In one embodiment, the composite particles and the matrix material are a powder. The powders can be combined through mechanical mixing including hand mixing in a mortar and pestle, grinding, ball milling, or jet milling. Alternatively, the powders may be added together with no further mixing or post-processing.

In another embodiment, the composite particles are a powder and the elastomer is a liquid. Known by those skilled in the art, additional processing such as dispersion, high shear mixing, stir bar mixing, shaking, or wet milling may be used to achieve a uniform consistency. Alternatively, the powder and liquid elastomer are combined with no further processing.

In some embodiments, the elastomer is a solid or semi-solid that is dissolved or swelled in solvent and the composite particles are added thereto. In yet another embodiment, the composite particles are a solid and the elastomer is a solid. For example, the composite particles in a powder form are added to an elastomer-epoxy resin under high shear to form the rubber composition.

In one embodiment, the rubber composition is then cured under thermal or UV conditions to create a solid, the solid. In another embodiment, the elastomer is a monomer that undergoes cross-linking. In certain embodiments, the elastomer is fibrous. In some embodiments, the composite is woven into the fabric threads of the elastomer to create a conductive fiber.

Devices Comprising the Compositions

The disclosed composites and rubber compositions can be used as an electron transport material in any number of electronics devices. One such device is a computer part, for example a circuit board or CPU. The electrical conductivity of the composite or rubber composition allows for electrostatic dissipation across the surface of the device, though prevents shorting from occurring between terminals and parts.

Alternative uses of the composite or rubber composition may be for electrostatic dissipation (ESD), for transportation fields such as aerospace and automotive, for corrosion protection and inhibition, for flooring, for windows and transparent coatings, for EMI/RFI shielding, for conductive inks, for 3D printing, or for top coats.

In some embodiments, the elastomer is a styrene-butadiene rubber, a styrene-isoprene rubber, an isoprene rubber, a chloroprene rubber or an isobutylene rubber. For example, any of the aforementioned composites and any of the aforementioned compositions may be used in tires.

It is sometimes desired to provide a tire with a rubber tread to promote reduced rolling resistance for the tire itself and thereby improved fuel economy for an associated vehicle, as well as reduced heat buildup in the tire tread during operation of the tire which, in turn, is expected to promote improved tire tread durability. To promote one or more of such desirable properties, it is sometimes desired to promote a reduction in the hysteretic property of the tread rubber.

To promote a reduction in the hysteresis of the tread rubber, to promote a reduction in e rubber's physical rebound property) it may desired to significantly reduce its reinforcing carbon black content and increase its silica (or derivative thereof) content. Accordingly, in one embodiment, a tire having a rubber composition comprising at least synthetic rubber elastomer (e.g., styrene-butadiene rubber, a styrene-isoprene rubber, an isoprene rubber, a chloroprene rubber or an isobutylene rubber.) and a plurality of composite particles as described herein, is provided. Inclusion of electrically conductive polymers and an oxide of silicon, in such a rubber composition can aid in discharging static electricity through the electrically non-conductive tread to its running surface. In more specific embodiments, the rubber composition has a sheet resistivity ranging from $1 \times 10^4$ Ω/sq to $1 \times 10^8$ Ω/sq. In some embodiments, the D(50) particle size of the oxide of silicon is less than 1000 nm. In some embodiments, the conductive polymer comprises a conjugated polymer.

Tires with a tread made with a rubber composition including the conductive polymer (e.g., conjugated polymers) and an oxide of silicon show low volume resistivity, indicating good ability to conduct static electricity. In one embodiment, the rubber composition has a volume resistivity that is less than $1 \times 10^9$ ohm-cm as measured by ASTM D257-98. In one embodiment, the rubber composition (e.g., in the form of a tire or tire tread) has a volume resistivity that is less than $1 \times 10^5$ ohm-cm as measured by ASTM D257-98.

In certain embodiments, the elastomer is a thermoplastic or thermosetting elastomer e.g., one or more elastomer selected from a homopolymer comprising conjugated diene monomers and a copolymer comprising a conjugated diene monomer, a monovinyl aromatic monomer and a triene monomer may be used.

Embodiments of the elastomer may further comprise an organic rubber. For example, the organic rubber may comprise one or more selected from: a natural rubber (formed from homo-polymerization of butadiene or its homologues or derivatives); 1,4-polyisoprene, 3,4-polyisoprene, trans-1,4-polybutadiene, cis-1,4-polybutadiene or 1,2-polybutadiene; one or more ethylene-based unsaturated co-polymeric monomer comprising butadiene and its homologues or derivatives; a butadiene-styrene copolymer using a butadiene isomer; polymers of isoprene, styrene and butadiene and various terpolymers thereof; an acrylonitrile-based copolymer and terpolymer rubber composition; and an isobutylene-based rubber.

In some embodiments, the elastomer may further comprise alkyd resin, natural oil, oil-modified alkyd resin, nylon, epoxide, thermoplastic polyester, unsaturated polyester, polycarbonate, or the like. More specifically, polyethylene, polypropylene, polybutylene, polystyrene, ethylene-propylene copolymer or terpolymer, polyoxymethylene and its copolymer, polyurethane, nitrocellulose, phenol resin, polysulfide rubber, vinyl butyrate, vinyl chloride, vinyl acetate, cellulose acetate and butyrate, viscose rayon, cellulose, ethylene copolymer, wax, shellac, organic rubber, etc. may be used.

A non-limiting example of preparing a rubber composition using a functional reinforcing filler (e.g., an oxide of silicon comprising a functional group bound thereto) includes a vulcanized rubber composition prepared by a process comprising: a step of mixing a curable elastomer with the functional reinforcing filler, an accelerator and a retardant to form a vulcanizable elastomer composition; and curing the vulcanizable elastomer composition by adding a curing agent.

In some embodiments, the accelerator may be one or more selected from the group consisting of benzothiazole, benzothiazole sulfenamide, dithiocarbamate, thiopholine, thiourea, xanthate, thiuram sulfide, amine and dithiophosphate. For example, the accelerator may comprise one or more selected from one or more benzothiazole (e.g., 2-mercaptobenzothiazole, zinc 2-mercaptobenzothiazole, 2,2'-dithiobisbenzothiazole, 2-morpholinothiobenzothiazole, 2-(4-morpholinodithio)benzothiazole, 2-(4-morpholinothio)benzothiazole, 2-(4-morpholinothio)-5-methylbenzothiazole, 2-(4-morpholinothio)-5-chlorobenzothiazole, 2-(2,6-dimethyl-4-morpholinothio)-benzothiazole, 2-(3,6-dimethyl-4-morpholinothio) benzothiazole, 2,2'-dibenzothiazole disulfide and 2-mercaptobenzothiazyl disulfide); one or more benzothiazole sulfenamide (e.g., N-cyclohexyl-2-benzothiazole sulfenamide, N,N'-dicyclohexyl-2-benzothiazole sulfenamide, N,N-diethyl-2 benzothiazole sulfenamide, N-t-butyl-2-benzothiazole sulfenamide, N,N-diisopropyl-2-benzothiazole sulfenamide, N-oxydiethylene-2-benzothiazole sulfenamide and N-oxydiethylene thiocarbamyl-oxydiethylene sulfonamide); one or more dithiocarbamate (e.g., cadmium diethyldithiocarbamate, lead diamyldithiocarbamate, lead dimethyldithiocarbamate, zinc dimethyldithiocarbamate, zinc diethyldithiocarbamate, zinc diamyldithiocarbamate, zinc di-n-butyldithiocarbamate, zinc dimethylpentamethylene dithiocarbamate, bismuth dimethyldithiocarbamate, copper dimethyldithiocarbamate, selenium diethyldithiocarbamate, selenium dimethyldithiocarbamate, tellurium diethyldithiocarbamate, piperidinium pentamethylene dithiocarbamate, 2-benzothiazole-N,N-diethyldithiocarbamate and dimethyl ammonium dimethyldithiocarbamate); one or more thiopholine (e.g., 4-mercaptomorpholine, 4-mercapto-2,6-dimethylmorpholine, 4,4'-dithiomorpholine, 4-[(4-morpholinylthio)thixomethyl]morpholine, 2,6-dimethylmorpholine disulfide, methylmorpholine disulfide; propyl 2,6-dimethyl morpholine disulfide, alkyl morpholine disulfide and phenyl morpholine disulfide); one or more thiourea (e.g., trimethylthiourea, 1,3-dibutylthiourea, N,N' dibutylthiourea, 1,3-diethylthiourea, dimethylethylthiourea, diphenylthiourea and tetramethylthiourea; one or more xanthate (e.g., sodium isopropylxanthate, zinc isopropylxanthate and zinc dibutylxanthate; one or more thiuram sulfide (e.g., tetramethylthiuram monosulfide, tetramethylthiuram disulfide, tetraethylthiuram disulfide, tetrabutylthiuram disulfide, dipentamethylenethiuram tetrasulfide, tetrabenzylthiuram disulfide, dimethyldiphenylthiuram disulfide and dipentamethylenethiuram monosulfide; one or more amine selected from cyclohexylethylamine, dibutylamine, heptaldehyde-aniline condensate; acetaldehyde-aniline condensate and guanidine, e.g., N,N'-diphenylguanidine, N,N'-di-o-tolyl-guanidine, o-tolylbiguanidine, N,N',N"-triphenylguanidine and diarylguanidine; and dithiophosphate.

In some embodiments, the retardant comprises one or more amine, for example, N-(cyclohexylthio)phthalimide, phthalic anhydride, benzoic acid, salicylic acid, stearic acid, N-nitrosodiphenylamine, sodium acetate, aromatic sulfonamide, dioctyl phthalate or magnesium oxide. More specifically, in some embodiments, the retardant comprises N-(cyclohexylthio)phthalimide, phthalic anhydride or aromatic sulfenamide.

In addition, the rubber composition may further comprise sulfur in order to improve physical properties. Specifically, sulfur may be added in an amount of 0.1 to 10 parts by weight, more specifically 1 to 5 parts by weight.

In some embodiments, a rubber composition comprising the functional reinforcing filler has high tan $\delta$ at 0° C. and low tan $\delta$ at 60° C. Furthermore, the functional reinforcing filler is capable of improving the processability and physical properties of rubber. In some embodiments; the rubber composition has a scorch time exceeding 14 minutes and a curing time less than 30 minutes (ASTM D5289-95). Certain embodiments of the rubber compositions have a 300% modulus of at least 5.0 MPa (ASTM D41.2-98a). Rubber compositions of the present disclosure may be applied to the manufacture of a variety of rubber products, e.g., automotive drive-belts, engine mounts, V-belts, conveyor belts, roller coatings, tires, components of tire (vehicle tire treads, subtreads, carcases, sidewalls, belt wedges, bead fillers and wire skim coats), shoe sole materials, packing rings, wire and cable sheaths, hoses, gaskets, sealing materials, or the like, so that the rubber products may have excellent tensile properties and dynamic properties.

It is readily understood by those having skill in the art that a rubber composition as disclosed herein can be tested (e.g., volume resistivity) and/or processed (e.g., compounded, vulcanized, mixed) using methods generally known in the art. For example, such methods are described in U.S. Pat. No. 9,162,530 and U.S. Pat. Pub. No. 2011/0146859, which are herein incorporated by reference in their entirety.

As disclosed herein, particles of the composite particles and composites (e.g., oxide of silicon and clay) act as a functionalized reinforcing filler that may include certain surface modifications (e.g., obtained from hydrolyzing an alkenylalkoxysilane compound). In certain embodiments, the functional group has a double bond and therefore, provides good reactivity for styrene-butadiene rubber and sulfur. When such a functional group (e.g., propenyl) is used in the composite particles it allows improvement of the physical properties of the elastomer through adjustment of the additional amount of sulfur without the additional use of a coupling agent.

In addition, because of superior hydrolysis activity shown by embodiments of the present disclosure, the problem of alcohol can be solved and a rubber mixture with longer scorch time can be prepared. Specifically, the oxide of silicon comprising a functional group bound thereto according to the present disclosure provides improvement in modulus, tensile strength, rotational resistance, and wet traction performance when used in the manufacture of tires.

The rubber composition can be compounded by methods such as mixing the various sulfur-vulcanizable constituent rubbers with various commonly used additive materials such as, for example, curing aids (e.g., sulfur), activators, retarders and accelerators, processing additives (e.g., aromatic, napthenic, and/or paraffinic processing oils), resins tackifying resins, silicas, plasticizers), fillers, pigments, fatty acid (e.g., stearic acid, palmitic acid, oleic acid, and combinations thereof), zinc oxide, waxes (e.g., microcrystalline waxes), anti-oxidants, anti-ozonants, peptizing agents and the like. As known to those skilled in the art, depending on the intended use of the sulfur vulcanizable and sulfur vulcanized material (rubbers), the additives mentioned above are selected and commonly used in conventional amounts.

In some embodiments, tackifier resin amounts range from about 0.5 to about 10 phr or from about 1 to about 5 phr. In some embodiments, optional processing aids amounts range from about 1 to about 50 phr. In some embodiments, amounts of antioxidants range from about 1 to about 5 phr. In some embodiments, the antioxidant is diphenyl-p-phenylenediarnine (or an anti-oxidant disclosed in *The Vanderbilt Rubber Handbook* (1978), Pages 344-6). In some embodiments, the amount of anti-ozonants ranges from about 1 to 5 phr. In some embodiments, the amount of fatty acid ranges from about 0.5 to about 3 phr. In some embodiments, the amount of zinc oxide ranges from about 1 to about 10 phr. In some embodiments, the amount of wax ranges from about 1 to about 5 phr. In some embodiments, the amount of peptizers ranges from about 0.1 to about 1 phr.

In some embodiments, the method comprises vulcanization of the rubber composition using a sulfur vulcanizing agent. Examples of suitable sulfur vulcanizing agents include elemental sulfur (free sulfur) or sulfur donating vulcanizing agents (e.g., an amine disulfide, polymeric polysulfide, sulfur olefin adducts). In certain specific embodiments, the sulfur vulcanizing agent is elemental sulfur. In some embodiments, the amount of the sulfur vulcanizing agent ranges from about 0.5 to about 4 phr, or less than about 8 phr.

Sulfur vulcanization accelerators are used to control the time and/or temperature required for vulcanization and to improve the properties of the vulcanized product (e.g., a rubber composition as described herein). In one embodiment, a single accelerator (i.e., a primary accelerator) is used. In some embodiments, the amount of the primary accelerator(s) ranges from about 0.5 to about 4 or from about 0.8 to about 1.5 phr. In another embodiment, a combination of a primary and a secondary accelerator is used. In certain related embodiments, the amount of the secondary accelerator is less than the amount of the primary accelerator (e.g., about 0.05 phr vs. about 3 phr). Combinations of accelerators might be expected to produce a synergistic effect on the final properties of the rubber composition and are somewhat better than those produced by use of either accelerator alone. In some embodiments, an accelerator may include, for example, amines, disulfides, guanidines, thioureas, thiazoles, thiurarns, sulfenamides, dithiocarbamates and xanthates. In certain embodiments, the primary accelerator is a sulfenamide. In related embodiments, the second accelerator is a guanidine, dithiocarbamate or thiuram compound.

In addition, delayed action accelerators may also be used. For example, an accelerator may be selected that is not affected by normal processing temperatures but produces a satisfactory cure at ordinary vulcanization temperatures. In contrast, in some embodiments, vulcanization retarders might also be used, where desired or appropriate.

The presence and relative amounts of the above additives are not required features of disclosed embodiments, unless otherwise indicated herein.

The mixing of the rubber composition can be accomplished by methods known to those having skill in the rubber mixing art. For example, ingredients are typically mixed in at least two stages. At least one "non-productive" stage followed by a "productive" mix stage. The terms "non-productive" and "productive" mix stages are well known to those having skill in the rubber mixing art. The final curatives/additives are typically mixed in the final productive mix stage. The productive mixing stage typically occurs at a temperature lower than the mix temperature(s) of the non-productive mixing stage(s).

The elastomer and composite particles can be mixed in one or more non-productive mix stages. The thermomechanical mixing step generally comprises a mechanical working in a mixer or extruder for a period of time suitable in order to produce a rubber temperature ranging from 140° C. to 190° C. The appropriate duration of the thermomechanical working varies as a function of the operating conditions, and the volume and nature of the components. For example, the thermomechanical working may range from 1 to 20 minutes. The composition may be incorporated in a variety of rubber components of the tire. For example, in some embodiments, a tread (including tread cap and tread base), sidewall, apex, chafer, sidewall insert, wirecoat or innerliner comprises a composition as disclosed herein.

In some embodiments, the oxide of silicon comprises a functional group (e.g., alkenylalkoxysilane) bound thereto. In some of those embodiments, the resultant material can be characterized as a "reinforcing filler" or "functional reinforcing filler." Such a material is highly dispersible in the elastomer compositions of the present invention. In certain embodiments, the concentration of the oxide of silicon ranges from 10 to 200 wt % or from 20 to 150 wt % of the elastomer. Other embodiments may further comprise additional functional reinforcing filler, such as those described in U.S. Pat. No. 9,127,167, which is hereby incorporated by reference.

Vulcanization of a pneumatic tire of certain embodiments is generally carried out at conventional temperatures ranging from about 100° C. to 200° C. In one embodiment, the vulcanization is conducted at temperatures ranging from about 110° C. to 180° C. Any of the usual vulcanization processes may be used for further processing of compounds disclosed herein, such as heating in a press or mold, heating with superheated steam or hot air. Embodiments of tires can be built, shaped, molded and cured by various methods which are known and will be readily apparent to those having skill in such art.

The various embodiments described above can be combined to provide further embodiments. Accordingly, to the extent that they are not inconsistent with the specific teachings and definitions herein, U.S. Provisional Application 62/360,047, filed Jul. 8, 2016; U.S. Provisional Application 62/475,646, filed Mar. 23, 2017; all of the U.S. patents, U.S. patent application publications, U.S. patent applications, foreign patents, foreign patent applications and non-patent publications referred to in this specification and/or listed in the Application Data Sheet are incorporated herein by reference, in their entirety.

EXAMPLES

The compositions disclosed herein are made according to the general methods described above the specific Examples which follow. Chemicals were obtained through commercial sources and were used without further processing unless otherwise stated. The following examples are provided for purposes of illustration and not limitation.

Example 1

Preparation of Polymer/Laponite Particle Composite

Figure 2:
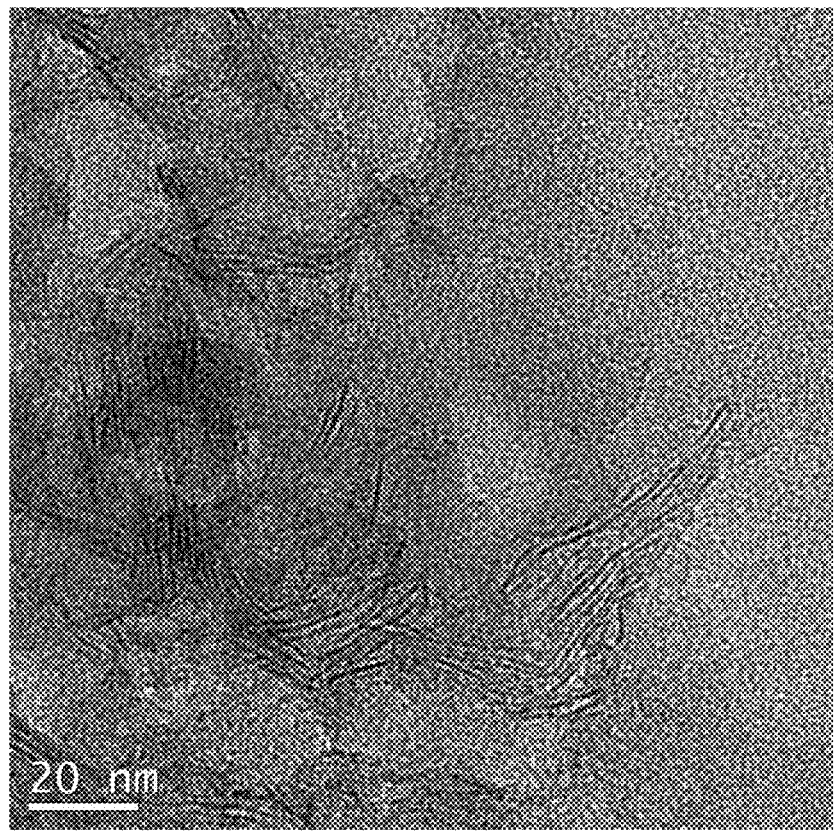
FIG. 2 is a TEM image of an exemplary polymer-clay composite material.
Figure 3A:
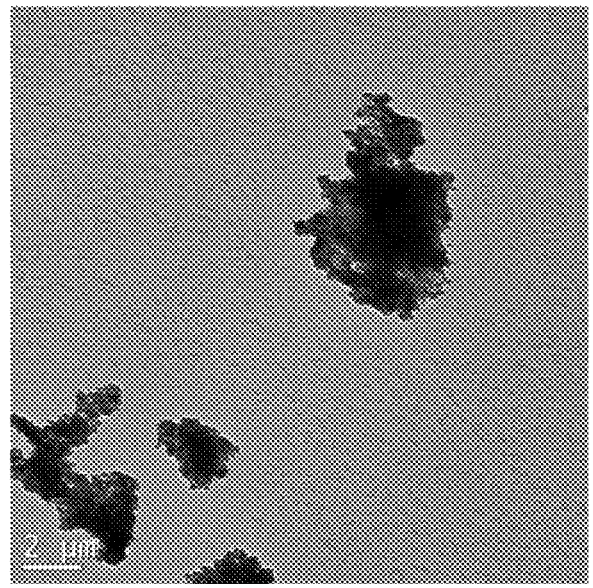
FIGS. 3A-B show transmission electron microscope micrographs of a conductive polymer-laponite composite.
Figure 3B:
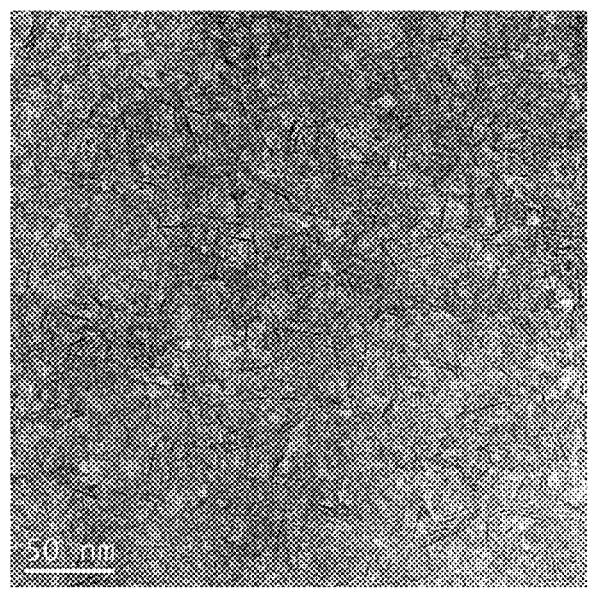

A polymer-laponite composite was synthesized by mixing laponite, 3,4-ethylenedioxythiophene, $FeCl_3$, polyvinyl alcohol, poly(sodium 4-styrenesulfonate), sodium dodecyl sulfate and water to create a reaction solution. Laponite was first dissolved in water and allowed to disperse for at least 24 hours. The final product was observed using TEM imaging (FIGS. 2, 3A-B). Other components were added sequentially in the order and at concentrations according to Table 2A below.

TABLE 2A

Reaction components for synthesis of composite particles

| Composite Composition | Reaction 1 Concentration (wt %) Composite L-18 | Reaction 2 Concentration (wt %) Composite L-19 |
| --- | --- | --- |
| Water | 98.5 | 98.5 |
| Laponite RDS | 0.3 | 0.3 |
| $FeCl_3$ | 0.2 | 0.2 |
| polyvinyl alcohol | 0.03 | — |
| sodium dodecyl sulfate | 0.3 | 0.3 |
| poly(sodium 4-styrenesulfonate) | 0.5 | 0.5 |
| 3,4-ethylenedioxythiophene | 0.2 | 0.2 |

Upon addition of all components, the reaction was allowed to stir for 24-48 hours. The polymerization was assessed as complete based on the drastic color change of the solution. Composites L-18 and L-19 showed superior performance characteristics.

The resultant polymer-laponite composites were centrifuged, filtered, and dried under elevated temperature. The dried product was pulverized and further processed to form aqueous solutions, concentrated paste, or homogeneous powder.

Additionally, Table 2B shows various other exemplary combinations of monomer, clay particles, oxidizing agent, and optional dopants used to prepare representative composites.

Modification of the composite with polyvinyl alcohol was performed by first dispersing PVA in water for at least 1 hour until the solution was transparent. A laponite solution was added to the mixture followed by monomer and oxidizing agent. Alternatively, preparation of a composition comprising a conductive polymer and a clay particle and matrix material (e.g., PVA) is described in detail in Example 5 below.

TABLE 2B

Reaction parameters used to synthesize conductive polymer-clay particle composites.

| Composite | Monomer | Monomer (g) | Clay Particle | Clay Particle (g) | FeCl$_3$ Oxidizing Agent (g) | Dopant | Dopant (g) |
|---|---|---|---|---|---|---|---|
| L-1 | EDOT | 0.049 | RDS Laponite | 0.1003 | 0.02424 | PVA | 0.00759 |
| L-2 | EDOT | 0.032 | RD Laponite | 0.2008 | 0.02508 | PVA | 0.0066 |
| L-3 | EDOT | 0.036 | RDS Laponite | 0.10004 | 0.01962 | PVA | 0.013145 |
| L-4 | EDOT | 0.037 | RDS Laponite | 0.20054 | 0.01812 | PVA | 0.012045 |
| L-5 | EDOT | 0.034 | RDS Laponite | 0.1 | 0.0246 | — | 0 |
| L-6 | EDOT | 0.032 | RD Laponite | 0.20104 | 0.02454 | — | 0 |
| L-7 | EDOT | 0.032 | RDS Laponite | 0.15025 | 0.03744 | — | 0 |
| L-8 | EDOT | 0.031 | RD Laponite | 0.29988 | 0.03834 | — | 0 |
| L-9 | Pyrrole | 0.041 | RD Laponite | 0.30088 | 0.03642 | — | 0 |
| L-10 | Analine | 0.12 | RD Laponite | 0.30046 | 0.03612 | — | 0 |
| L-11 | Fluoronone | 0.031 | RD Laponite | 0.30032 | 0.03738 | — | 0 |
| L-12 | Analine | 0.036 | RD Laponite | 0.30004 | 0.03666 | — | 0 |
| L-13 | — | 0 | RDS Laponite | 0.75025 | 0.03738 | — | 0 |
| L-14 | EDOT | 0.033 | RDS Laponite | 0.4503 | 0.03726 | — | 0 |
| L-15 | — | 0 | RDS Laponite | 0.5994 | 0.03612 | — | 0 |
| L-16 | EDOT | 0.035 | RDS Laponite | 0.30064 | 0.0369 | — | 0 |

Example 2

Characterization Polymer/Laponite Composite

Composite L-18 was evaluated using transmission electron microscopy (FIG. 3A). A bimodal distribution of particle size was observed, with the two distributions centered at approximate diameters of 100 nm and 2 µm. As observed by osmium-tetroxide stain, the conductive polymer (i.e., poly(3,4-ethylenedioxythiophene)) forms an inter-connected network that spans the surface of the clay particle (FIG. 3B). Laponite particles are disk shaped and randomly oriented and evenly distributed throughout the material, which indicates excellent dispersion of the reaction mixture. The representative composite had the following composition shown in Table 3 below:

TABLE 3

Representative composite from Reaction 1

| Components of Composite L-18 | Concentration % (w/w) |
|---|---|
| Laponite | 19 |
| FeCl$_3$ | 15 |
| polyvinyl alcohol | 2 |
| sodium dodecyl sulfate | 19 |
| poly(sodium 4-styrenesulfonate) | 32 |
| poly(3,4-ethylenedioxythiophene) | 13 |

The composite was then diluted with a carrier fluid and deposited as a film according to Example 8 below. The resultant film had a sheet resistivity of 1,000 Ω/sq. In addition, it was shown that the loading of the representative polymer can be reduced while maintaining electrostatic discharge performance. The above representative composition was diluted 6-fold with water, isopropyl alcohol, or methanol and still showed sheet resistivity ranging from $10^4$ to $10^6$ Ω/sq.

The composite was also evaluated by blade and tape using ASTM D1842 (Standard Test Method for Determining Ink or Coating Adhesion of Plastic Substrates for Membrane Switch Applications) to evaluate adhesion of the representative composite (to itself and to the PET substrate). Dilutions of 2-, 3-, and 4-fold in water resulted in a score of 4/5. That is, the representative composite film showed adhesion where "little material was removed by the tape."

Example 3

Synthesis Polypyrrole/Silica Composite Particles

Conductive polypyrrole-silica composites particles were synthesized by mixing silica and pyrrole monomer in water to create a reaction solution. After allowing 30 minutes for mixing, the oxidizing agent (FeCl$_3$) was added to the reaction solution to initiate polymerization. The final mixture was allowed to stir for approximately 24 hours at temperatures ranging from 0° C. to 22° C. and deemed to be complete by the appearance of a drastic color change of solution. The amounts of the reaction components for 6 representative polymer-silica composite particles (S-1 to S-6) are shown in Table 4, below.

TABLE 4

Reaction components for 6 representative polypyrrole-silica composite particles

| Composite | Water (% wt) | Silica (% wt) | Monomer (% wt) | Oxidant (% wt) |
|---|---|---|---|---|
| S-1 | 99.1 | 0.3 | 0.4 | 0.2 |
| S-2 | 91.8 | 2.6 | 3.5 | 2.1 |
| S-3 | 99.2 | 0.3 | 0.3 | 0.2 |
| S-4 | 99.4 | 0.3 | 0.2 | 0.1 |
| S-5 | 99.5 | 0.3 | 0.1 | 0.1 |
| S-6 | 98.8 | 0.6 | 0.4 | 0.2 |

The resultant polypyrrole-silica composite particles were centrifuged, filtered, and dried under elevated temperature. The dried product was pulverized and further processed to form monodisperse aqueous solutions or slurries, concentrated paste, or homogeneous powder.

Example 4

Characterization Polypyrrole/Silica Composite Particles

Figure 4A:
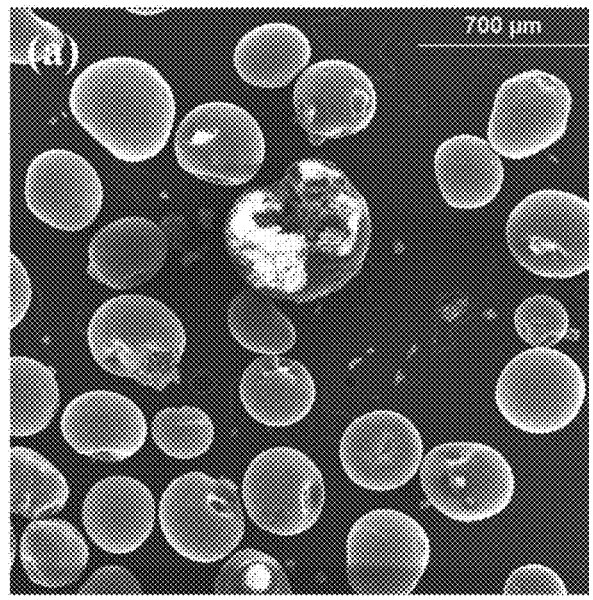
FIGS. 4A-B depict scanning electron micrograph of a polypyrrole-silica composite at 100× (FIG. 4A) and 500× magnification (FIG. 4B).
Figure 4B:
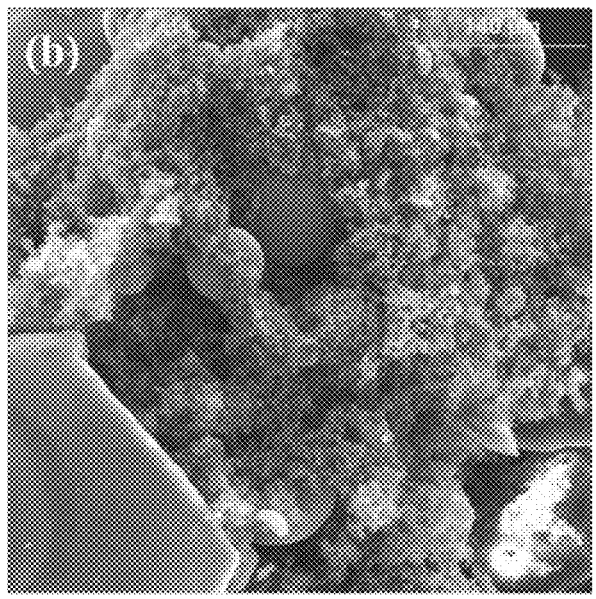

The polypyrrole-silica composite particles of Example 3 were verified using scanning electron microscopy (FIGS. 4A-B). The properties of Composites S-1 to S-6 are depicted in Table 5 below.

TABLE 5

Physical and electrical properties of exemplary polypyrrole-silica composite particles

| Composite | Bulk Density (g/mL) | Bulk Resistivity ($\Omega \cdot$ cm) |
|---|---|---|
| S-1 | 0.235 | $2.7 \times 10^4$ |
| S-2 | 0.145 | $2.2 \times 10^{12}$ |
| S-3 | 0.455 | $6.8 \times 10^4$ |
| S-4 | 0.462 | $3.3 \times 10^5$ |
| S-5 | 0.257 | $4.4 \times 10^8$ |
| S-6 | 0.290 | $8.7 \times 10^5$ |

Different loading of silica and polypyrrole resulted in changes to bulk density and bulk resistivity for the tested composite particles. Silica powder used in the preparation described above has an intrinsic bulk resistivity of $4.8 \times 10^8$ $\Omega \cdot$cm and a bulk density of 0.260 g/mL.

Example 5

Incorporation of Composite Particles into Matrix Material

To create a representative film comprising a polypyrrole-silica composite, Composite S-1 was mixed with polyvinyl alcohol (MW=130 kDa) at a constant speed for 10-30 minutes until the mixture appeared to be well dispersed and homogeneous throughout. Poly(siloxane)-based wetting agent (AFCONA-3585) was added for enhanced spreading.

The resultant solution was coated using a doctor blade at 8 mil wet film thickness onto a poly(ethylene terephthalate) substrate. The deposited films were placed in an oven and dried at 70° C. for 5-30 minutes. The dried film had a composition of 74 wt % Composite S-1, 13 wt % polyvinyl alcohol and 13 wt % poly(siloxane) and a sheet resistivity of $10^4$ $\Omega$/sq.

Example 6

Functionalization of Silica-Based Composite Particles

The surface functionality of the silica particle (i.e., oxide of silicon) can be modified to enhance dispersibility of the particle without hindering other aspects of the composite particle synthesis (e.g., conductive polymer formation). Rice husk ash silica was modified using an amine-functionalized silane coupling agent, (3-aminopropyl)triethoxysilane, in water. The resultant functionalized silica provided better dispersibility in acidic solution, which is required for conductively polymer synthesis.

Samples of functionalized silica were stirred for 5-30 minutes at room temperature. Following the mixing, pyrrole monomer was added and mixed for an additional 30 minutes before the addition of $FeCl_3$. The final mixture was allowed to mix for approximately 24 hours at temperatures ranging from 0° C. to 22° C. The polymerization reaction was judged to be complete by observing a drastic color change in the reaction solution. Table 6 below shows exemplary component ratios for the functionalization reaction and subsequent polymerization.

TABLE 6

Composition of (3-aminopropyl)triethoxysilne modified silica

| Component | wt % |
|---|---|
| Water | 98.8 |
| Silica | 0.3 |
| (3-aminopropyl)triethoxysilane | 0.3 |
| Pyrrole (monomer) | 0.4 |
| $FeCl_3$ (oxidizing agent) | 0.2 |

Figure 5A:
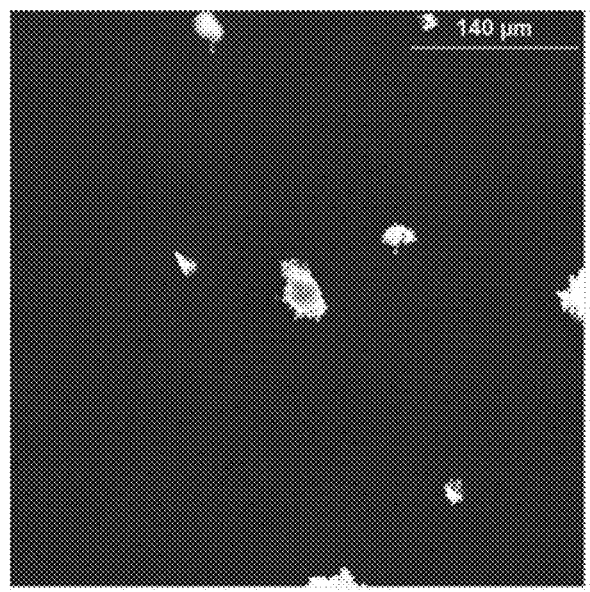
FIGS. 5A-B show a scanning electron micrograph of polypyrrole-modified silica composite at 500× (FIG. 5A) and 3500× magnification (FIG. 5B).
Figure 5B:
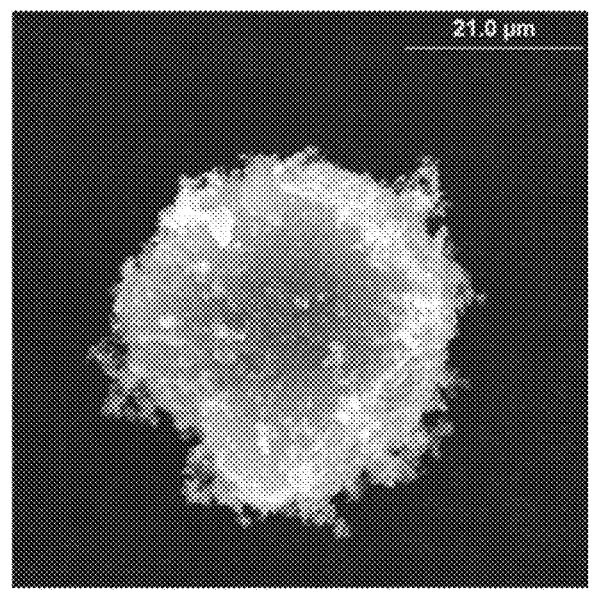
Figure 6:
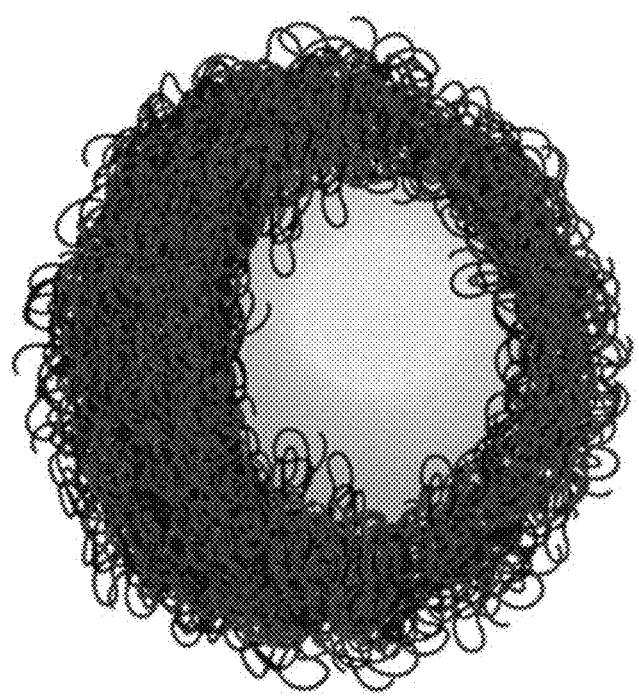
FIG. 6 shows a schematic illustration of the core-shell type morphology of a conductive polymer-particle composite.

The resultant core-shell network of the modified silica following polymerization was observed and characterized using scanning electron microscopy (SEM) as shown in FIGS. 5A and 5B. The micrographs positively identify the core-shell morphology of the polypyrrole-modified silica composites synthesized, which is also illustrated schematically (FIG. 6). Additionally, the polypyrrole-modified silica composite particles had a bulk conductivity of $3.7 \times 10^5$ $\Omega \cdot$cm and a bulk density of 0.186 g/mL.

Example 7

Synthesis and Characterization of Conductive Rubber Compositions

An exemplary rubber composition comprising a composite particle and an elastomer was synthesized using a poly(styrene-isoprene-styrene)-based triblock copolymer. Without wishing to be bound by theory, it is thought that the isoprene block provides desirable elastomeric properties and the styrene sulfonic acid blocks acts as a dopant for the conductive polymer, poly(3,4-ethylenedioxythiophene) (PEDOT).

First, 1.2 g of poly(styrene-isoprene-styrene) triblock copolymer (22 wt % styrene monomer) was converted via sulfonation into poly([styrene sulfonic acid]-isoprene-[styrene sulfonic acid]) using 2 mL of sulfuric acid while stirring for 3 hours. The solution was neutralized with NaOH and the polymer was precipitated using methanol.

The resultant poly([styrene sulfonic acid]-isoprene-[styrene sulfonic acid]) triblock copolymer was then added to a composite particle solution containing 0.3 wt % Laponite RDS, 0.2 wt % PEDOT, and 0.2 wt % $FeCl_3$ in water. The composition was then coated at a 2 mil wet film thickness, targeting a solution concentration of 1 wt % of the elastomer. The final film had a sheet resistivity of $10^6$ $\Omega$/sq and was afforded with a smooth, blue transparent finish.

Example 8

Preparation of Composite Dispersion

In order to lower the concentration of solid material in solution, as well as optimize the wettability and transparency, exemplary composites were diluted with both aqueous and non-aqueous solvents and modifiers as shown in Table 7.

Figure 7A:
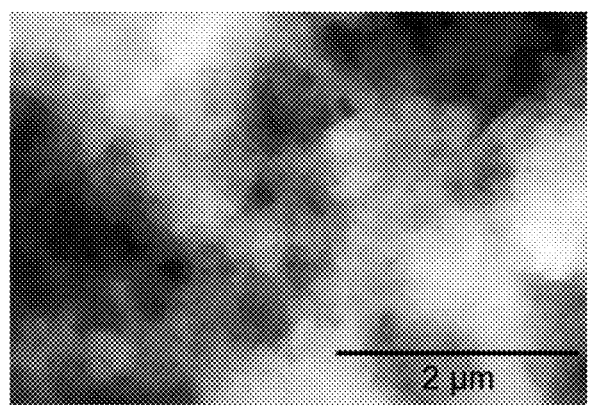
FIGS. 7A-B show atomic force micrographs of a laponite-based conductive polymer-clay particle composite deposited as a film onto a PET substrate.
Figure 7B:
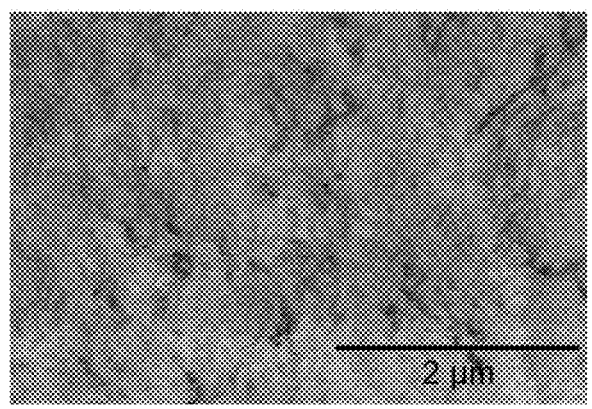

Select composite dispersions from Table 7 were coated onto polyethylene terephthalate (PET) sheets. A poly(siloxane)-based wetting agent AFCONA 3585 was added to a composite and the mixture was diluted in water, isopropyl alcohol or methanol as appropriate. Dispersions had a composite to solvent ratio ranging from 1:2 to 1:6 with a final wetting agent concentration of 0.5% w/w. The PET substrates were coated using a doctor blade at 2 mil wet film thickness at allowed to dry overnight. Coatings were imaged using atomic force microscopy (FIG. 7A-B).

TABLE 7

Exemplary composites in carrier fluid (i.e., dispersants)

| # | Composite (g) | water (g) | Rhoplex HA-16 (g) | Rhoplex WL-51 (g) | Butyle Cellosolve (g) | DEG (g) | DEG_BuE (g) | 25% Dynol/BC (g) | Paraloid B66 DMC (g) | Acetone (g) | IPA (g) | Eastman 349W (g) | pH | Liquid conductivity (mS/cm) | Sheet Resistivity (Ω/sq) |
|---|---|---|---|---|---|---|---|---|---|---|---|---|---|---|---|
| L-3 | 2.764 | 7.351 | 1.176 | — | 1.229 | 0.498 | 0.524 | 0.030 | — | — | — | — | 2.86 | 0.873 | — |
| L-4 | 2.680 | 7.324 | — | 1.173 | 1.218 | 0.506 | 0.508 | 0.032 | — | — | — | — | 6.53 | 0.8866 | 1.00E+10 |
| L-3 | 1.226 | — | — | — | — | — | — | — | — | — | 3.9 | — | | | 1.00E+08 |
| L-17 | 1.541 | — | — | — | — | — | — | — | — | — | 4.0 | — | | | — |
| L-6 | 1.245 | — | — | — | — | — | — | — | — | — | 3.9 | — | | | 3.00E+07 |
| L-6 | 1.244 | — | — | — | — | — | — | — | — | — | 0 | 3.876 | | | 3.00E+09 |
| L-5 | 1.017 | — | — | — | 3.000 | — | — | 0.110 | — | — | 0 | — | | | — |
| L-6 | 1.015 | — | — | — | 4.011 | — | — | 0.201 | — | — | 0 | — | | | 1.00E+10 |
| L-5 | 1.046 | — | — | — | 1.009 | — | — | 0.103 | — | — | 1.0 | — | | | — |
| L-7 | 2.486 | — | — | — | — | — | — | — | — | — | — | — | 7.8 | — | 1.00E+08 |
| L-2 | 2.459 | — | — | — | — | — | — | — | — | — | — | — | 7.7 | — | 1.00E+08 |
| L-12 | 2.456 | — | — | — | — | — | — | — | — | — | — | — | 7.7 | — | 1.00E+08 |
| L-7 | 1.221 | — | — | — | — | — | — | — | — | — | — | — | 5.8 | — | 1.00E+09 |
| L-12 | 1.221 | — | — | — | — | — | — | — | — | — | — | — | 5.8 | — | 3.00E+08 |
| L-14 | 1.215 | — | — | — | — | — | — | — | — | — | — | — | 5.8 | — | 1.00E+08 |
| L-16 | 1.233 | — | — | — | — | — | — | — | — | — | — | — | 6.5 | — | 3.00E+08 |
| L-14 | 1.240 | — | — | — | — | — | — | — | — | — | — | — | 6.5 | — | 3.00E+08 |
| L-7 | 1.254 | — | — | — | — | — | — | — | — | — | — | — | 6.5 | — | 1.00E+09 |
| L-16 | 1.241 | — | — | — | — | — | — | — | 0.648 | — | — | — | 6.5 | — | — |
| L-16 | 1.269 | — | — | — | — | — | — | — | 1.112 | 6.517 | — | — | | | — |
| L-1 | 1 | — | — | — | — | — | — | — | — | — | — | — | 3.02 | 3.71 | 1.00E+06 |
| L-2 | 1 | — | — | — | — | — | — | — | — | — | — | — | 2.89 | 3.8 | 1.00E+06 |
| L-3 | 1 | — | — | — | — | — | — | — | — | — | — | — | 3.11 | 3.18 | 3.00E+06 |
| L-4 | 1 | — | — | — | — | — | — | — | — | — | — | — | 3.41 | 2.76 | 1.00E+06 |
| L-5 | 1 | — | — | — | — | — | — | — | — | — | — | — | 2.98 | 3.9 | 1.00E+06 |
| L-6 | 1 | — | — | — | — | — | — | — | — | — | — | — | 3.19 | 3.6 | 1.00E+06 |
| L-7 | 1 | — | — | — | — | — | — | — | — | — | — | — | | | 3.00E+06 |
| L-8 | 1 | — | — | — | — | — | — | — | — | — | — | — | | | 3.00E+06 |
| L-9 | 1 | — | — | — | — | — | — | — | — | — | — | — | | | 3.00E+06 |
| L-10 | 1 | — | — | — | — | — | — | — | — | — | — | — | | | 3.00E+06 |
| L-11 | 1 | — | — | — | — | — | — | — | — | — | — | — | | | 1.00E+06 |
| L-12 | 1 | — | — | — | — | — | — | — | — | — | — | — | | | 1.00E+06 |
| L-14 | 1 | — | — | — | — | — | — | — | — | — | — | — | | | 1.00E+07 |
| L-16 | 1 | — | — | — | — | — | — | — | — | — | — | — | | | 3.00E+06 |

The invention claimed is:

1. A rubber composition comprising:
 i) a plurality of composite particles, each composite particle comprising a conductive polymer and an oxide of silicon; and
 ii) an elastomer,
wherein the oxide of silicon comprises a (3-aminopropyl)triethoxysilane functional group bound thereto.

2. The rubber composition of claim 1, wherein the composite particles comprise core-shell particles having a core comprising the oxide of silicon and a shell comprising the conductive polymer.

3. The rubber composition of claim 1, wherein the composite particle comprises a clay comprising the oxide of silicon and the clay comprises a kaolin, smectite, illite, chlorite, sepiolite, attapulgite or combinations thereof.

4. The rubber composition of claim 1, wherein the composite particle comprises a clay comprising the oxide of silicon and the clay comprises baileychlore, chamosite, clinochlore, cookeite, donbassite, gonyerite, nimite, odinite, orthochamosite, pennatite, ripidolite, suoitelaponite, hectorite, saponite, bentonite, or laponite.

5. The rubber composition of claim 1, wherein the elastomer comprises an isoprene rubber, a butadiene rubber, a chloroprene rubber, an isobutylene rubber, a butyl rubber, a styrene-butadiene rubber, a styrene-isoprene rubber, a nitrile rubber, an ethylene-propylene rubber, an epichlorohydrin rubber, a polyacrylic rubber, a silicone rubber, a fluorosilicone rubber, a fluoroelastomer, a perfluoroelastomer, a polyether block amide, a chlorosulfonated polyethylene, an ethylene vinyl acetate, a thermoplastic elastomers, a polysulfide, a resilin, an elastin, an elastolefin or combinations thereof.

6. The rubber composition of claim 1, wherein the elastomer comprises a styrene-butadiene rubber, a styrene-isoprene rubber, an isoprene rubber, a chloroprene rubber or an isobutylene rubber.

7. The rubber composition of claim 1, wherein the conductive polymer comprises polyaniline, polypyrrole, polythiophene, polyacetylene, polyphenylene, polyvinylene, poly(p-phenylene vinylene), polyphenylene sulfide, polycarbazole, polyindole, polyazepine, polyfluorene, polyphenylene, polypyrene, polyazulene, polynaphthalene or combinations thereof.

8. The rubber composition of claim 1, wherein the mass percent of the composite particles is less than 3% of the total mass of the rubber composition.

9. The rubber composition of claim 1, wherein the conductive polymer is poly(3,4-ethylenedioxythiophene) (PEDOT), the oxide of silicon is silicon dioxide and the elastomer is a styrene-isoprene rubber.

10. The rubber composition of claim 1, wherein the conductive polymer is polypyrrole, the oxide of silicon is silicon dioxide and the elastomer is a styrene-isoprene rubber.

11. The rubber composition of claim 1, wherein the conductive polymer is poly(3,4-ethylenedioxythiophene) (PEDOT), the composite particle comprises laponite and the elastomer is a styrene-isoprene rubber.

12. The rubber composition of claim 1, wherein the conductive polymer is polypyrrole, the composite particle comprises laponite and the elastomer is a styrene-isoprene rubber.

13. An article comprising the rubber composition of claim 1.

14. The article of claim 13, wherein the article is a tire, a tire component, a belt, a belt component, a hose, a gasket or a film.

15. The article of claim 14, wherein the article is a tire.

16. The film of claim 14, wherein the film has a sheet resistivity ranging from $1 \times 10^4$ Ω/sq to $1 \times 10^8$ Ω/sq.

17. A rubber composition comprising:
   i) a plurality of composite particles, each composite particle comprising a conductive polymer and an oxide of silicon; and
   ii) an elastomer,
wherein the elastomer comprises a (styrene sulfonic acid)-isoprene-(styrene sulfonic acid) block copolymer.

18. The rubber composition of claim 17, wherein the composite particles comprise core-shell particles having a core comprising the oxide of silicon and a shell comprising the conductive polymer.

19. The rubber composition of claim 17, wherein the oxide of silicon is silicon dioxide.

20. The rubber composition of claim 17, wherein the oxide of silicon comprises a functional group bound thereto.

21. The rubber composition of claim 20, wherein the functional group is (3-aminopropyl)triethoxysilane.

22. The rubber composition of claim 17, wherein the composite particle comprises a clay comprising the oxide of silicon and the clay comprises a kaolin, smectite, illite, chlorite, sepiolite, attapulgite or combinations thereof.

23. The rubber composition of claim 17, wherein the composite particle comprises a clay comprising the oxide of silicon and the clay comprises baileychlore, chamosite, clinochlore, cookeite, donbassite, gonyerite, nimite, odinite, orthochamosite, pennatite, ripidolite, suoitelaponite, hectorite, saponite, bentonite, or laponite.

24. The rubber composition of claim 17, wherein the conductive polymer comprises polyaniline, polypyrrole, polythiophene, polyacetylene, polyphenylene, polyvinylene, poly(p-phenylene vinylene), polyphenylene sulfide, polycarbazole, polyindole, polyazepine, polyfluorene, polyphenylene, polypyrene, polyazulene, polynaphthalene or combinations thereof.

25. The rubber composition of claim 17, wherein the mass percent of the composite particles ranges from 0.01% to 50% of the total mass of the rubber composition.

26. The rubber composition of claim 17, wherein the conductive polymer is poly(3,4-ethylenedioxythiophene) (PEDOT) and the composite particle comprises laponite.

27. The rubber composition of claim 17, wherein the conductive polymer is polypyrrole and the composite particle comprises laponite.

28. An article comprising the rubber composition of claim 17.

29. The article of claim 28, wherein the article is a tire, a tire component, or a film.

30. The film of claim 29, wherein the film has a sheet resistivity ranging from $1 \times 10^4$ Ω/sq to $1 \times 10^8$ Ω/sq.

* * * * *